(12) United States Patent
Kato

(10) Patent No.: US 6,778,324 B1
(45) Date of Patent: Aug. 17, 2004

(54) VIEWFINDER OPTICAL SYSTEM AND OPTICAL APPARATUS

(75) Inventor: Yumiko Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/642,807

(22) Filed: Aug. 22, 2000

(30) Foreign Application Priority Data

| Aug. 25, 1999 | (JP) | ............................................. 11-238084 |
| Jan. 6, 2000 | (JP) | ....................................... 2000-000847 |
| Aug. 10, 2000 | (JP) | ....................................... 2000-243394 |

(51) Int. Cl.[7] ............................. G02B 23/00; G02B 5/04
(52) U.S. Cl. .......................... 359/431; 359/831; 359/834
(58) Field of Search ................................ 359/362, 676, 359/420–423, 431–433, 629–634, 831–837; 396/373–386

(56) References Cited

U.S. PATENT DOCUMENTS

| 5,640,632 | A | | 6/1997 | Koyama et al. | ............. 396/382 |
| 5,678,080 | A | * | 10/1997 | Miyamoto | ................... 396/267 |
| 5,886,824 | A | * | 3/1999 | Takahashi | |
| 5,920,428 | A | * | 7/1999 | Kim | ............................ 359/432 |
| 6,008,948 | A | * | 12/1999 | Togino | ........................ 359/637 |
| 6,178,042 | B1 | | 1/2001 | Imamura | ...................... 359/431 |
| 6,178,052 | B1 | * | 1/2001 | Aoki et al. | |
| 6,282,381 | B1 | * | 8/2001 | Koyama | ...................... 396/384 |

FOREIGN PATENT DOCUMENTS

| JP | 6-167739 | | 6/1994 |
| JP | 8-179400 | | 7/1996 |
| JP | 10-206933 | | 8/1998 |
| JP | 11-211998 | * | 8/1999 |
| JP | 2000-131735 | * | 5/2000 |
| JP | 2001-194705 | * | 7/2001 |

* cited by examiner

*Primary Examiner*—Thong Q. Nguyen
(74) *Attorney, Agent, or Firm*—Fitzpatrick, Cella, Harper & Scinto

(57) ABSTRACT

A viewfinder optical system includes an objective lens unit, an image inverting unit for converting an object image formed via the objective lens unit into a non-inverted erecting image, and an eyepiece lens unit for observing the non-inverted erecting image, wherein the image inverting unit comprises a first transparent body and a second transparent body which are disposed with an interval put therebetween, the second transparent body having only a function of transmitting a ray of light, and wherein the interval between the first transparent body and the second transparent body is not uniform. Further, a viewfinder optical system includes an objective lens unit, an image inverting unit for converting an object image formed via the objective lens unit into a non-inverted erecting image, and an eyepiece lens unit for observing the non-inverted erecting image, wherein the image inverting unit comprises a first transparent body and a second transparent body which are disposed with an interval put therebetween, the second transparent body having only a function of transmitting a ray of light, and wherein at least one of surfaces of the first transparent body and the second transparent body is a rotationally-asymmetrical surface.

59 Claims, 24 Drawing Sheets

FIG.11(A) WIDE-ANGLE END
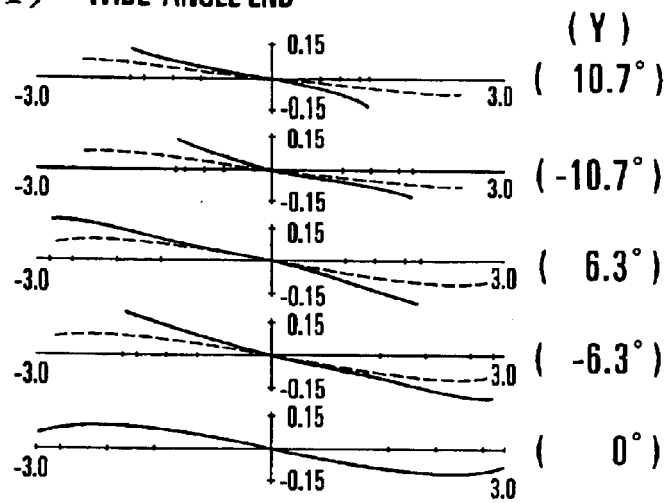
FIG.11(B) MIDDLE FOCAL LENGTH POSITION
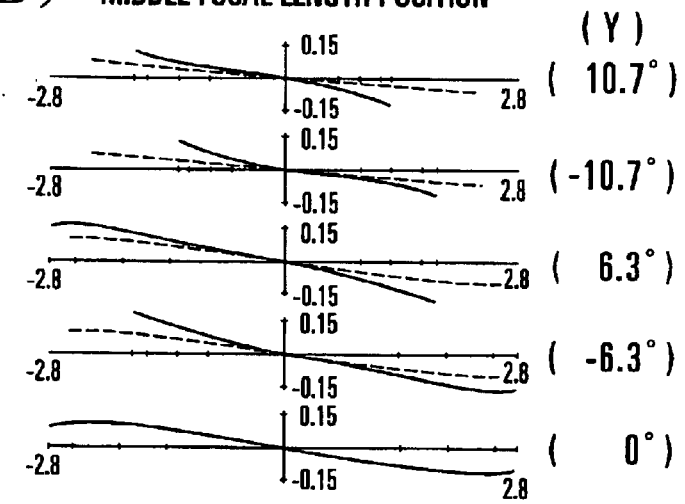
FIG.11(C) TELEPHOTO END
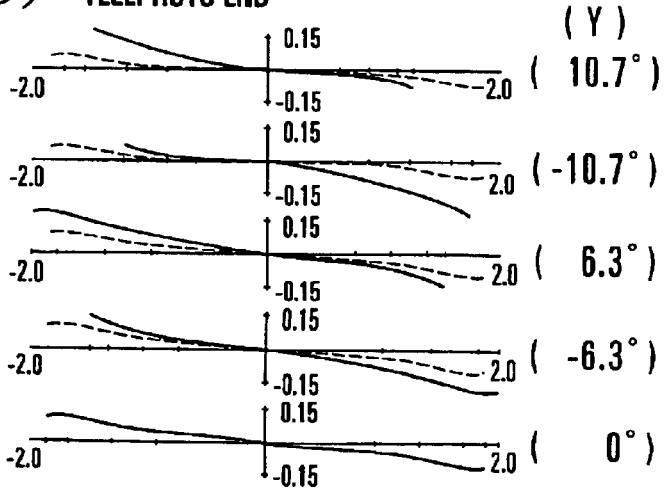

FIG.12(A) WIDE-ANGLE END
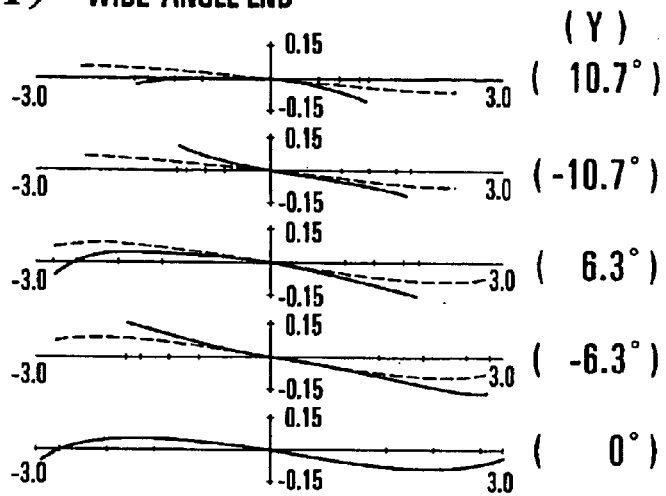
FIG.12(B) MIDDLE FOCAL LENGTH POSITION
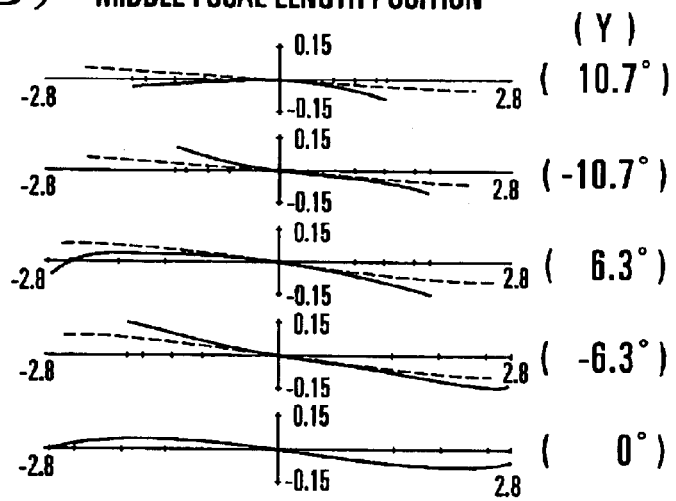
FIG.12(C) TELEPHOTO END
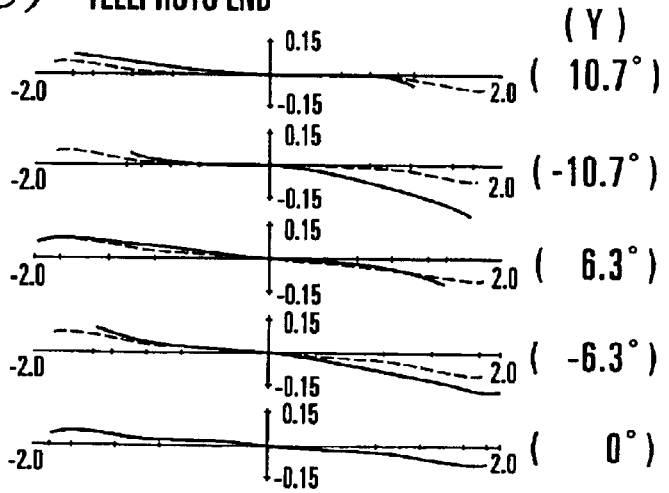

FIG.13(A) WIDE-ANGLE END
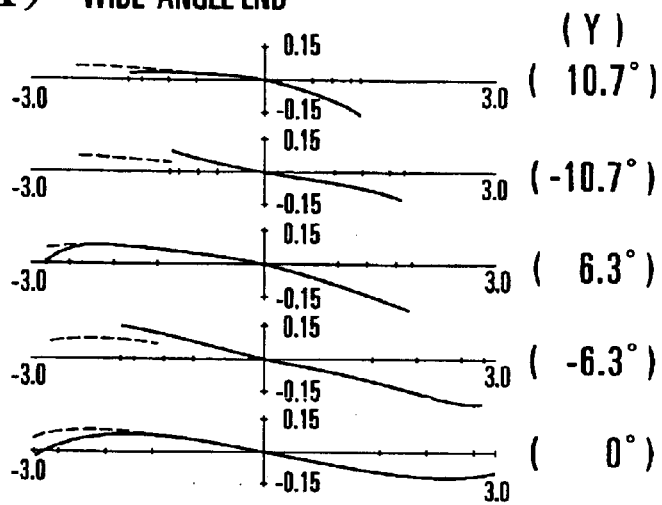
FIG.13(B) MIDDLE FOCAL LENGTH POSITION
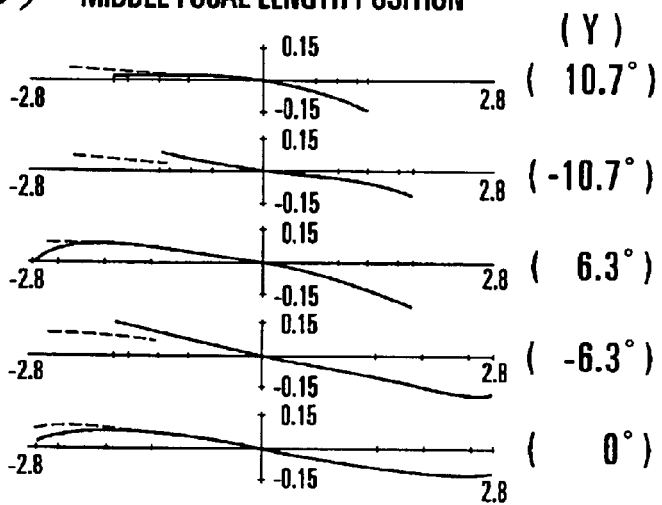
FIG.13(C) TELEPHOTO END
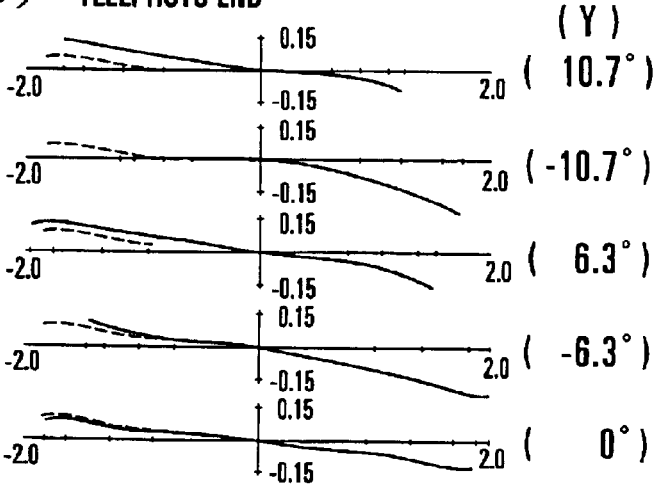

FIG.14(A) WIDE-ANGLE END
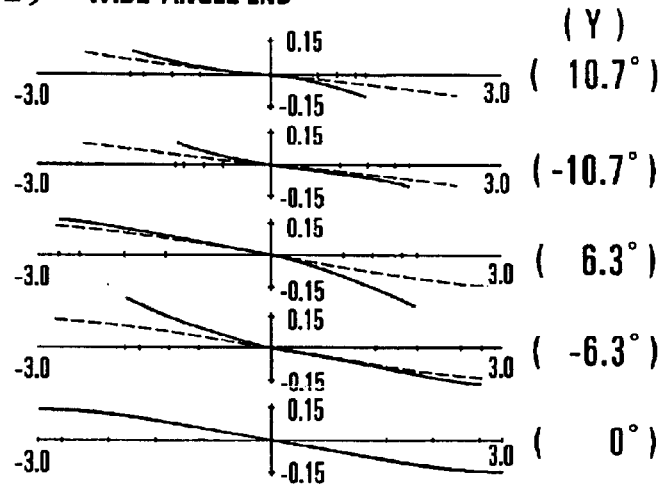
FIG.14(B) MIDDLE FOCAL LENGTH POSITION
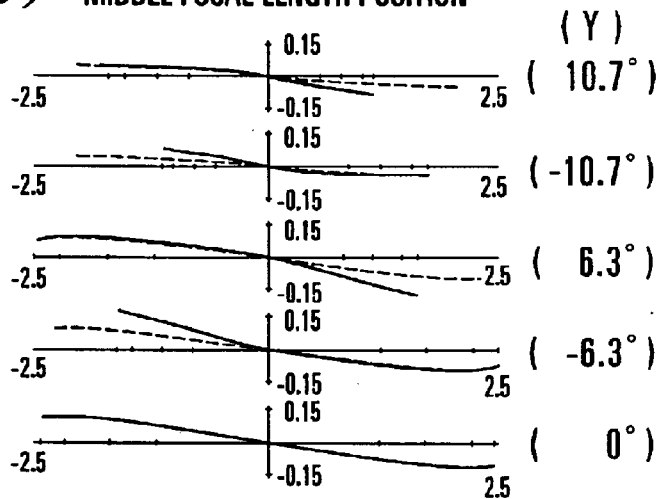
FIG.14(C) TELEPHOTO END
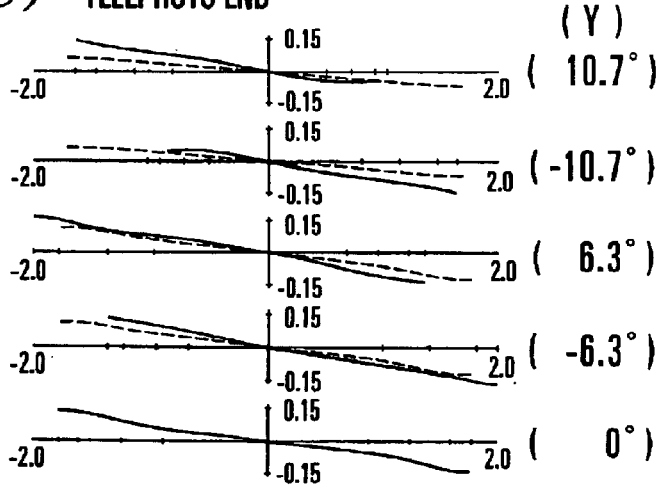

FIG.15(A) WIDE-ANGLE END
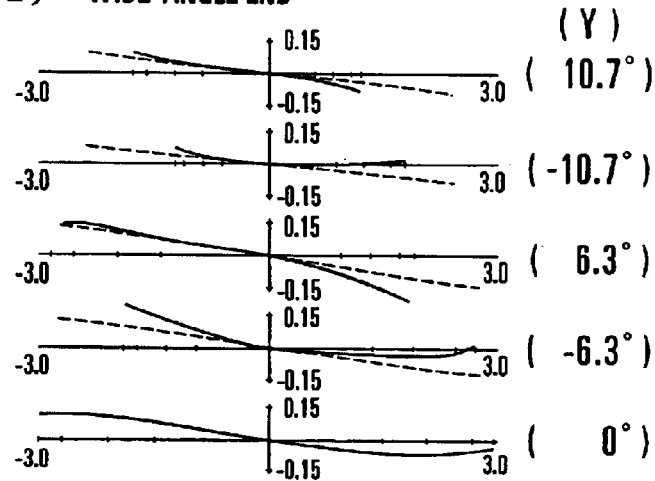
FIG.15(B) MIDDLE FOCAL LENGTH POSITION
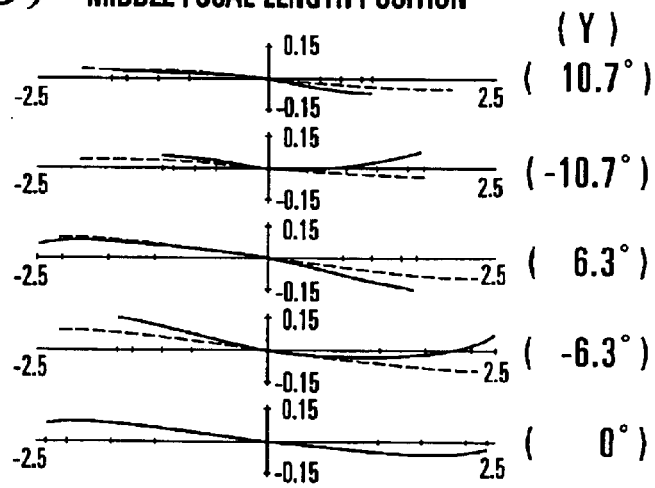
FIG.15(C) TELEPHOTO END
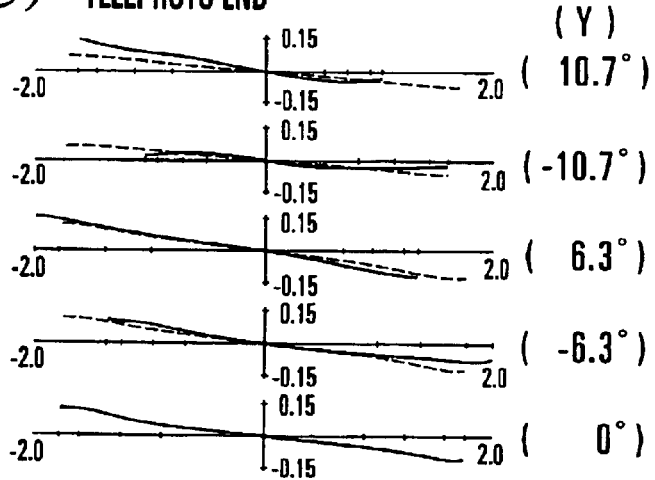

FIG.16(A) WIDE-ANGLE END
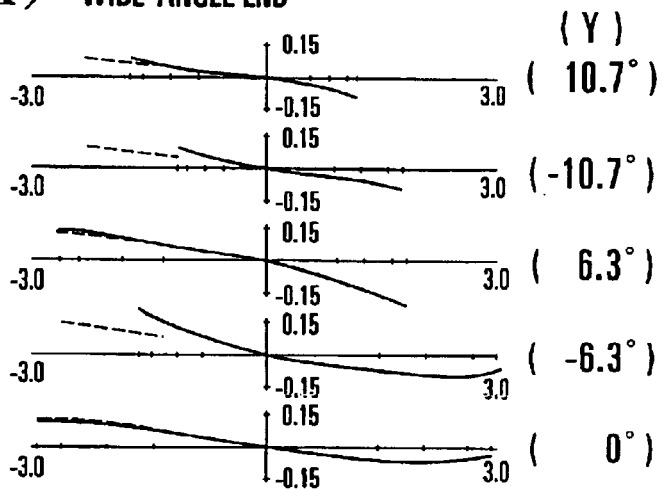
FIG.16(B) MIDDLE FOCAL LENGTH POSITION
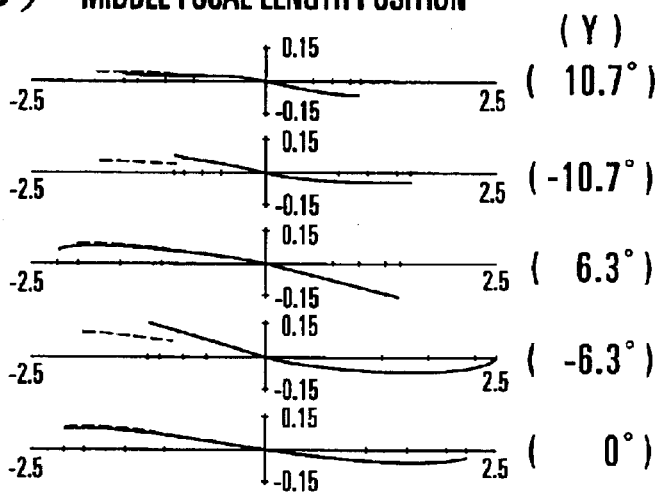
FIG.16(C) TELEPHOTO END
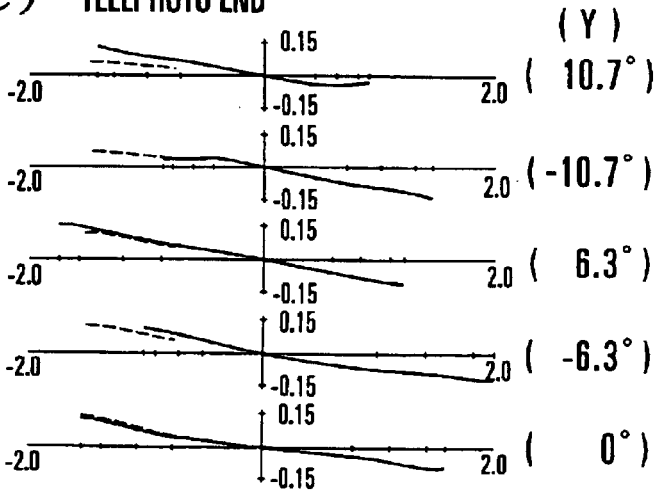

VIEWFINDER OPTICAL SYSTEM AND OPTICAL APPARATUS

BACKGROUND OF THE INVENTION

1. Field of the Invention

The present invention relates to a viewfinder optical system, and more particularly to a viewfinder optical system suitable for use in an optical apparatus, such as a video camera, a digital camera or the like, arranged to enable a viewfinder image (object image) formed as an inverted real image by an objective lens to be observed as a non-inverted erecting viewfinder image by utilizing an image inverting unit as appropriately set.

2. Description of Related Art

Heretofore, in viewfinder systems for optical apparatuses, such as photographic cameras and video cameras, there have been proposed a variety of viewfinder optical systems of the real image type in which a real image formed on a primary image forming plane by an objective lens is converted into an erecting image and the erecting image is viewed through an eyepiece lens. Such a viewfinder optical system of the real image type makes it easier to reduce the size of the whole optical system than a viewfinder optical system of the virtual image type. Therefore, these days, the viewfinder optical system of the real image type is widely used in cameras having zoom lenses.

A viewfinder optical system of the real image type using a Porro prism for forming a non-inverted erecting image has such a tendency that a part of the Porro prism protrudes in the height (up-and-down) direction and the width (right-and-left) direction of an optical apparatus according to the external form of the Porro prism, thereby enlarging the whole viewfinder system. In order to shorten the total lens length of a viewfinder optical system according to a decrease in size and thickness of the whole camera, in Japanese Laid-Open Patent Application No. Hei 6-167739 (corresponding to U.S. Pat. No. 5,640,632), there is disclosed a small-sized viewfinder optical system in which an optical path leading to a primary image forming plane on which an object image is formed by an objective lens is bent by a reflecting surface and the primary image forming plane is thus formed inside an image inverting unit.

FIG. 30 is a sectional view showing essential parts of a conventional viewfinder optical system using a prism and a roof prism for bending an optical path leading to a primary image forming plane. In FIG. 30, reference character OL denotes an objective lens, and reference character P denotes a prism for forming a non-inverted erecting image. The prism P is composed of a first prism P1 and a second prism (roof prism) P2. Reference character S denotes a field frame, which is disposed within a narrow space across which an exit surface 13 of the first prism P1 and an entrance surface 21 of the second prism P2 are opposed to each other. A viewfinder image formed as an inverted real image by the objective lens OL is formed in the vicinity of the field frame S through the first prism P1. Reference character EL denotes an eyepiece lens, which is used for observing a non-inverted erecting viewfinder image into which the inverted real viewfinder image formed in the vicinity of the field frame S is converted through the second prism P2.

In the viewfinder optical system shown in FIG. 30, if it is designed to increase an angle of field, it is necessary to enlarge the second prism P2, so that there is a tendency for the size of the camera to increase in the thickness (depth) direction thereof. Meanwhile, in the viewfinder optical system, the focal length "fe" of the eyepiece lens corresponds to the length from the image forming position to the eyepiece lens. Then, assuming that the focal length of the objective lens is denoted by "fo", the viewfinder magnification γ is expressed by the following equation:

$$\gamma = fo/fe$$

Accordingly, if the second prism P2 is enlarged so as to increase an angle of field, an optical path from the image forming position to the eyepiece lens EL becomes longer. Thus, the focal length "fe" of the eyepiece lens EL becomes longer to decrease the viewfinder magnification γ, so that it becomes difficult to observe a good viewfinder image.

With regard to an image inverting unit which is small in size and is capable of enlarging an angle of view and a viewfinder magnification, for example, in Japanese Laid-Open Patent Application No. Hei 8-179400 and Japanese Laid-Open Patent Application No. Hei 10-206933, there is disclosed a viewfinder optical system in which two prisms are disposed with an air gap put at a minute interval therebetween.

FIGS. 31 and 32 show the basic construction of a viewfinder optical system of the real image type using a prism and a roof prism for bending an optical path leading to a primary image forming plane, which construction is similar to that disclosed in Japanese Laid-Open Patent Application No. Hei 10-206933. In FIGS. 31 and 32, reference character OL denotes an objective lens, and reference character P denotes a prism for forming a non-inverted erecting image. The prism P is composed of a first prism P11 and a second prism (roof prism) P12, and an exit surface 111 of the first prism P1 and an entrance surface 121 of the second prism P2 are disposed, in parallel, with a minute air gap "d" put therebetween. Reference character S denotes a field frame, which is disposed in the vicinity of an exit surface 123 of the second prism P2 (on a primary image forming plane). A viewfinder image formed as an inverted real image by the objective lens OL is converted, through a roof reflecting surface 122 of the second prism P12, into a non-inverted erecting image, which is formed in the vicinity of the field frame S. Reference character EL denotes an eyepiece lens, which is used for observing the non-inverted erecting viewfinder image formed in the vicinity of the field frame S through the second prism P12.

In the construction shown in FIGS. 31 and 32, a light flux coming from the objective lens OL passes through the exit surface 111 of the first prism P11 and the entrance surface 121 of the second prism P12 and is then image-inverted and reflected once toward the object side by the roof reflecting surface 122. The reflected light flux is further totally-reflected by the entrance surface 121 of the second prism P12, so that a viewfinder image is formed on the primary image forming plane in the vicinity of the exit surface 123 of the second prism P12. A reflecting member M1 is arranged to reflect a light flux coming from the primary image forming plane to lead the reflected light flux to the eyepiece lens EL.

In the conventional viewfinder optical system shown in FIGS. 31 and 32, the exit surface 111 of the first prism P11 and the entrance surface 121 of the second prism P12 are decentered with respect to the optical axis of the objective lens OL or the eyepiece lens EL. Further, in order to cause a light flux reflected from the roof reflecting surface 122 of the second prism P12 to be totally reflected by the entrance surface 121 of the second prism P12, i.e., in order to utilize the entrance surface 121 of the second prism P12 both for transmission and reflection, the exit surface 111 of the first prism P11 and the entrance surface 121 of the second prism P12 are disposed, almost in parallel, with the minute air gap "d" put therebetween, as shown in FIG. 32.

Therefore, as shown in FIG. 32, rays of light indicated by solid lines have the respective angles of refraction which differ according to the positions at which the rays pass through the exit surface 111 of the first prism P11 or according to the angles of incidence of the rays on the exit surface 111 of the first prism P11. Accordingly, an optical path length possible within the minute air gap "d" becomes, for example, the length a1 or a2 (a1<a2). Therefore, astigmatism, coma, etc., become varying with right and left sides of a view field, so that it becomes difficult to observe a good viewfinder image.

In addition, as rays of light indicated by dashed lines, the surface reflection occurs between the exit surface 111 of the first prism P11 and the entrance surface 121 of the second prism P12. As indicated by the routes of those rays, a ray reflected by the entrance surface 121 of the second prism P12 is further reflected by the exit surface 111 of the first prism P11 and is then made to enter the entrance surface 121 of the second prism P12, thereby becoming a ghost of the ordinary ray indicated by a solid line, so that a double image would be formed. Therefore, the conventional viewfinder optical system has such an disadvantage as to lower the optical performance thereof.

Further, such a ghost makes the width of a double image vary, as t1 or t2 (t1<t2), according to the angle of incidence of a ray on the exit surface 111 of the first prism P11. For example, even if a ghost of the double image width t1 is within a permissible range because the air gap "d" is minute, a ghost of the double image width t2 is conspicuous. Thus, there is a problem that a difference in the double image occurs between the right and left sides of a view field.

BRIEF SUMMARY OF THE INVENTION

It is an object of the invention to provide a viewfinder optical system capable of making a good viewfinder image to be observed over the whole range of a field of view when an object image formed via an objective lens unit is converted, by utilizing an image inverting unit, into a non-inverted erecting image to be observed through an eyepiece lens unit.

To attain the above object, in accordance with an aspect of the invention, there is provided a viewfinder optical system, which comprises an objective lens unit, an image inverting unit for converting an object image formed via the objective lens unit into a non-inverted erecting image, and an eyepiece lens unit for observing the non-inverted erecting image, wherein the image inverting unit comprises a first transparent body and a second transparent body which are disposed with an interval put therebetween, the second transparent body having only a function of transmitting a ray of light, and wherein the interval between the first transparent body and the second transparent body is not uniform.

According to a preferred aspect of the invention, in the viewfinder optical system, at least one of a surface of the first transparent body and a surface of the second transparent body which are opposite to each other is a rotationally-asymmetrical surface.

According to a preferred aspect of the invention, in the viewfinder optical system, the first transparent body has a surface having only a function of reflecting a ray of light, and a surface having both a function of reflecting a ray of light and a function of transmitting a ray of light.

According to a preferred aspect of the invention, in the viewfinder optical system, the second transparent body has a second entrance surface for transmitting a light flux coming from the objective lens unit, and a transmission surface disposed at an acute angle with the second entrance surface, the first transparent body consists of a first entrance surface disposed with the interval put between the transmission surface and the first entrance surface and arranged to allow a light flux coming from the transmission surface to enter the first entrance surface, a reflecting surface arranged to reflect a light flux coming from the first entrance surface toward the first entrance surface, a total-reflection surface provided at a part of the first entrance surface and arranged to totally reflect a light-flux coming from the reflecting surface, and an exit surface arranged to allow a light flux coming from the total-reflection surface to exit, and the image inverting unit further comprises a reflecting member arranged to reflect a light flux coming from the exit surface toward the eyepiece lens unit.

According to a preferred aspect of the invention, in the viewfinder optical system, the to transmission surface is a rotationally-asymmetrical surface.

The above and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIG. 6 is a sectional view showing essential parts of a viewfinder optical system according to an eighth embodiment of the invention.

FIGS. 11(A), 11(B) and 11(C) are diagrams showing various transverse aberration curves in a concentric lens system related to the first embodiment of the invention.

FIGS. 12(A), 12(B) and 12(C) are diagrams showing various transverse aberration curves in a system having decentering aberration uncorrected, related to the first embodiment of the invention.

FIGS. 13(A), 13(B) and 13(C) are diagrams showing various transverse aberration curves in the first embodiment of the invention.

FIGS. 14(A), 14(B) and 14(C) are diagrams showing various transverse aberration curves in a concentric lens system related to the fifth embodiment of the invention.

FIGS. 15(A), 15(B) and 15(C) are diagrams showing various transverse aberration curves in a system having decentering aberration uncorrected, related to the fifth embodiment of the invention.

FIGS. 16(A), 16(B) and 16(C) are diagrams showing various transverse aberration curves in the fifth embodiment of the invention.

DETAILED DESCRIPTION OF THE INVENTION

Hereinafter, preferred embodiments of the invention will be described in detail with reference to the drawings.

Prior to entering the description of embodiments of the invention, the method of expressing constituent elements of the embodiments an,d the common items thereof are described with reference to FIG. 28.

Since an optical system employed in the invention is a decentering optical system, the respective surfaces constituting the optical system has no common optical axis. Therefore, in the case of the embodiments of the invention, with the center of a ray-effective aperture of the first surface R1 assumed to be an origin, a route of a ray passing through the origin and the center of a pupil is defined as a reference axis of the optical system.

Further, the axes of the coordinate system are defined as follows.

Figure 28:
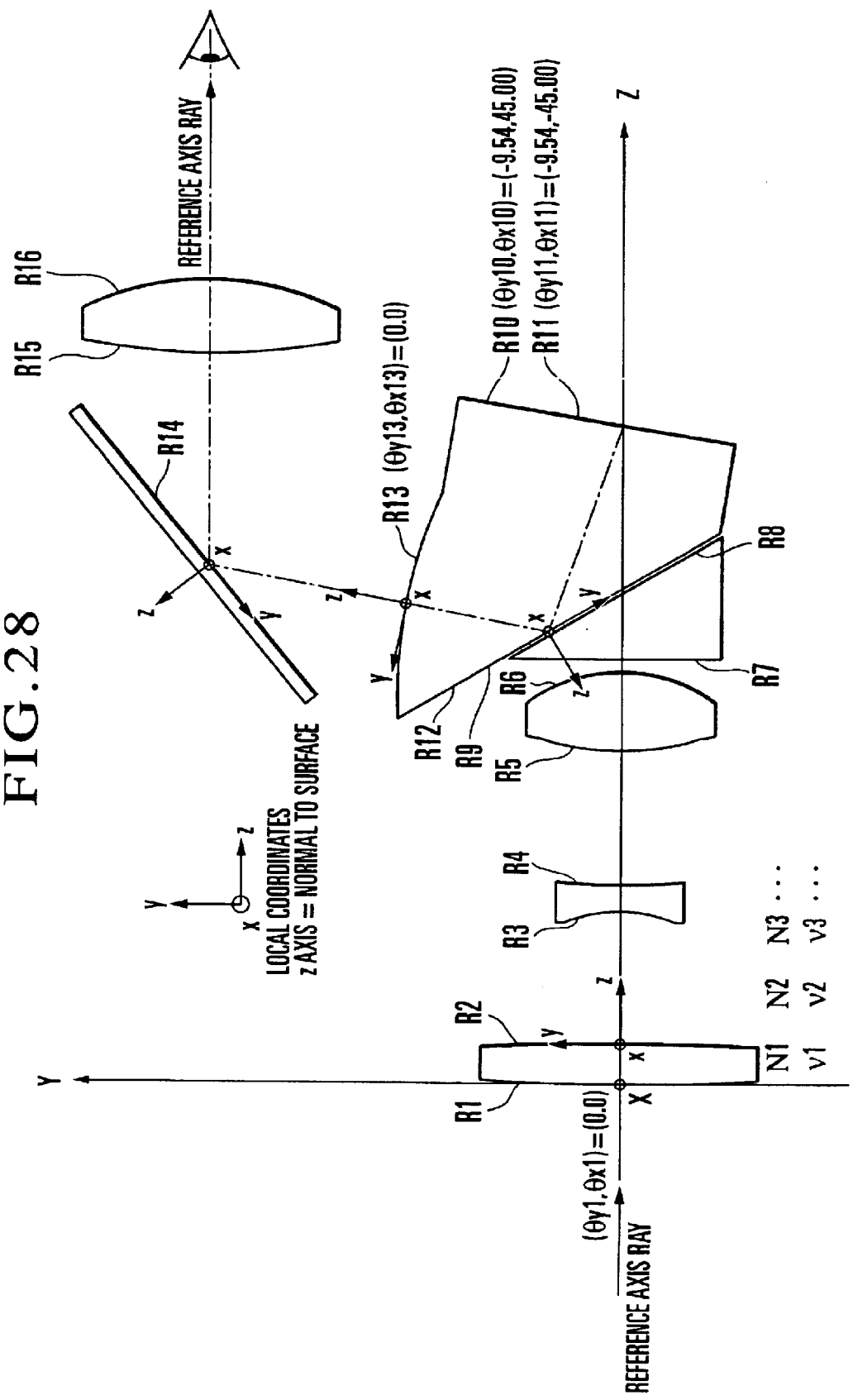
FIG. 28 is an explanatory diagram showing a coordinate system adopted in each of the embodiments of the invention.

Z axis: a part of the reference axis leading to the second surface R2 from the origin;

Y axis: a straight line passing through the origin and directed at an angle of 90° counterclockwise with the Z axis within a tilt plane (within a plane of the drawing of FIG. 28); and X axis: a straight line passing through the origin and perpendicular to each of the Z axis and the Y axis (a straight line perpendicular to a plane of the drawing of FIG. 28).

Further, a point at which the reference axis and the i-th surface (i=1, 2, 3, . . . ) intersect is defined as a surface vertex. In the viewfinder optical system in each of the embodiments of the invention, two prisms disposed with a minute air gap put therebetween are referred to as the first prism and the second prism in the order of passage of a ray of light.

In order to express the shape of the i-th surface in the optical system, Ri is used to denote the radius of curvature of the i-th surface, Di is used to denote a scalar quantity representing an interval between surface vertexes of the i-th surface and the (i+1)th surface with the surface vertex assumed to be a point at which the reference axis and the i-th surface intersect, and Ni and vi are used to respectively denote the refractive index and Abbe number of a medium between the i-th surface and the (i+1)th surface. In addition, a tilt angle of the i-th surface within a Y-Z plane is expressed by an angle $\theta yi$ (°) which a normal to the i-th surface extending from the surface vertex of the i-th surface makes with a part of the reference axis incident on the i-th surface, with the counterclockwise direction assumed to be plus, and a tilt angle of the i-th surface within an X-Z plane is expressed by an angle $\theta xi$ (°) which a normal to the i-th surface extending from the surface vertex of the i-th surface makes with a part of the reference axis incident on the i-th surface, with the counterclockwise direction assumed to be plus. However, in an entrance surface of the second prism, these tilt angles are defined by angles relative to a part of the reference axis incident on the (i−1)th surface (an exit surface of the first prism).

Further, the viewfinder optical system according to each of the embodiments of the invention has a spherical surface, a rotationally-symmetrical aspheric surface and a rotationally-asymmetrical aspheric surface. A spherical surface portion of the rotationally-symmetrical aspheric surface or the rotationally-asymmetrical aspheric surface is expressed as the shape of a spherical surface by using the radius of curvature Ri. The sign of the radius of curvature Ri is assumed to be minus when the center of curvature is located on the first surface side along the reference axis advancing from the first surface to the pupil, and is assumed to be plus when on the pupil side.

Further, the shape of each surface can be easily expressed by an equation using local coordinates having the original located on the above-mentioned surface vertex. Accordingly, in each of the following equations for a spherical surface, a rotationally-symmetrical aspheric surface and a rotationally-asymmetrical aspheric surface, the shape of a surface is expressed by using the local coordinates (x, y, z) thereof.

The shape of a spherical surface is expressed by the following equation:

$$z = \frac{y^2/R}{1 + \sqrt{1-(y/R)^2}}$$

The shape of a rotationally-symmetrical aspheric surface is expressed by the following equation:

$$z = \frac{y^2/R}{1 + \sqrt{1-(1+k)\cdot(y/R)^2}} + By^4 + Cy^6 + Dy^8$$

The shape of a rotationally-asymmetrical aspheric surface is expressed by the following equation:

$$z = \frac{x^2/r11}{1 + \sqrt{1-(1+k11)\cdot(x/r11)^2}} + B11x^4 + C11x^6 + D11x^8 \quad (x \geq 0)$$

$$z = \frac{x^2/r12}{1 + \sqrt{1-(1+k12)\cdot(x/r12)^2}} + B12y^4 + C12y^6 + D12y^8 \quad (x < 0)$$

R, r11 (x≧0), r12 (x<0), r21 (y≧0), and r22 (y<0) are paraxial radii of curvature, and k, k11, k12, k21, k22, B, B11, B12, B21, B22, C, C11, C12, C21, C22, D, D11, D12, D21, and D22 are coefficients.

$$z = \frac{y^2/r22}{1 + \sqrt{1-(1+k22)\cdot(y/r22)^2}} + B22x^4 + C22x^6 + D22x^8 \quad (y < 0)$$

$$z = \frac{x^2/r21}{1 + \sqrt{1-(1+k21)\cdot(y/r21)^2}} + B21y^4 + C21y^6 + D21y^8 \quad (y \geq 0)$$

Figure 1:
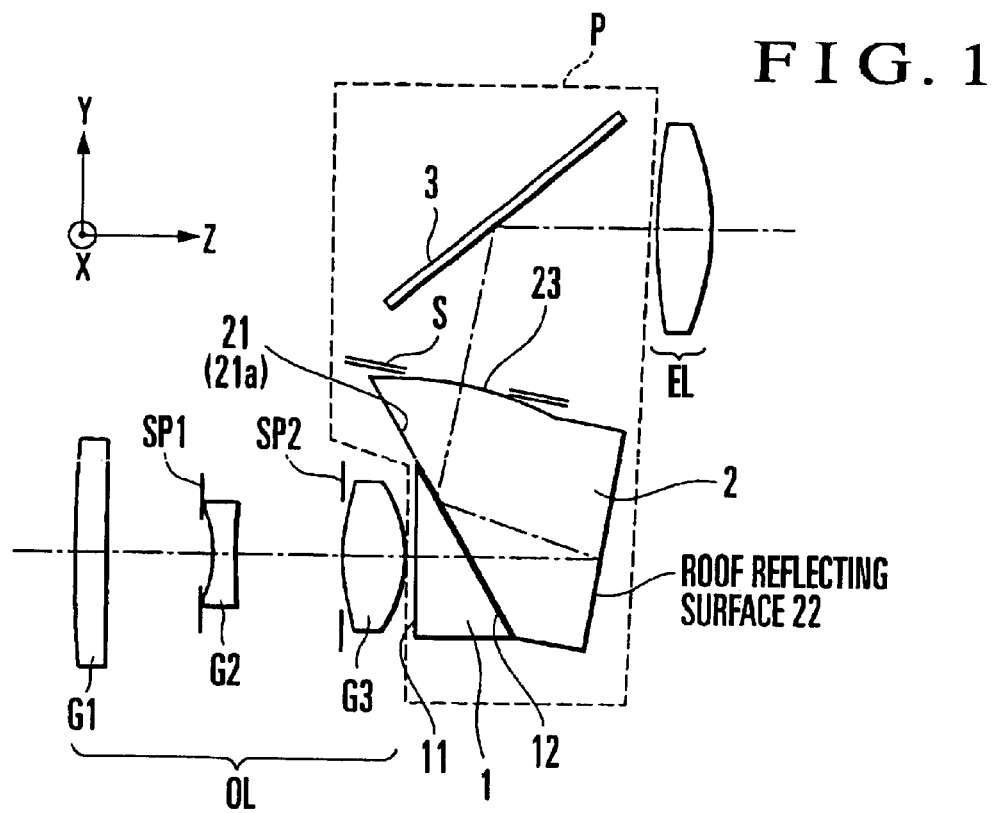
FIG. 1 is a sectional view showing essential parts of a viewfinder optical system according to a first embodiment of the invention.

FIG. 1 is a sectional view showing essential parts, within the Y-Z plane, of a viewfinder optical system according to a first embodiment (numerical example 1) of the invention.

In FIG. 1, reference character OL denotes an objective lens. The objective lens OL includes three lenses, i.e., a fixed positive lens G1, a negative lens. G2 movable along the optical axis for variable magnification, and a positive lens G3 for compensating for shift of an image plane due to the variation of magnification. Reference character P denotes an image inverting unit for obtaining a non-inverted erecting image. The image inverting unit P includes a first prism 1 (second transparent body), a second prism 2 (first transparent body) and a reflecting member 3. Reference character S denotes a field frame for limiting a viewfinder field. The field frame S is disposed at the position of a primary image forming plane on which an object image is formed by the objective lens OL, or disposed in the vicinity of the primary image forming plane. A viewfinder image as a real image by the objective lens OL is formed on the primary image forming plane in the vicinity of the field frame S through the first prism 1 and the second prism 2. Reference character EL denotes an eyepiece lens. The eyepiece lens EL allows the viewfinder image formed in the vicinity of the field frame S to be observed through the reflecting member 3. Reference characters SP1 and SP2 denote stops, which are disposed within the objective lens OL.

Next, the first and second prisms 1 and 2 and the reflecting member 3, which constitute the image inverting unit P in the first embodiment, are described.

Figure 9:
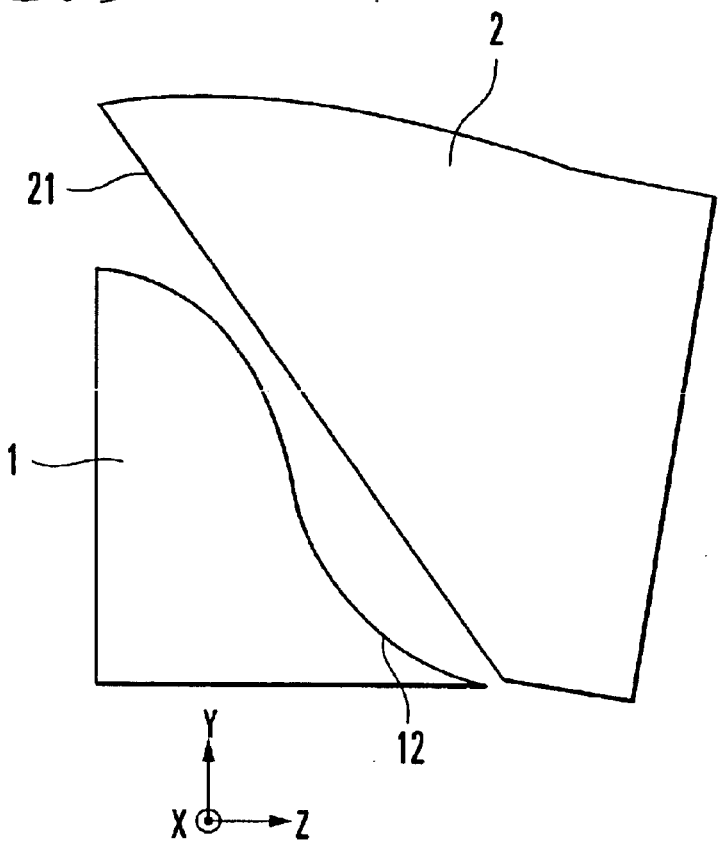
FIG. 9 is an enlarged view of a first prism in a Y-Z plane in the first embodiment of the invention.
Figure 10:
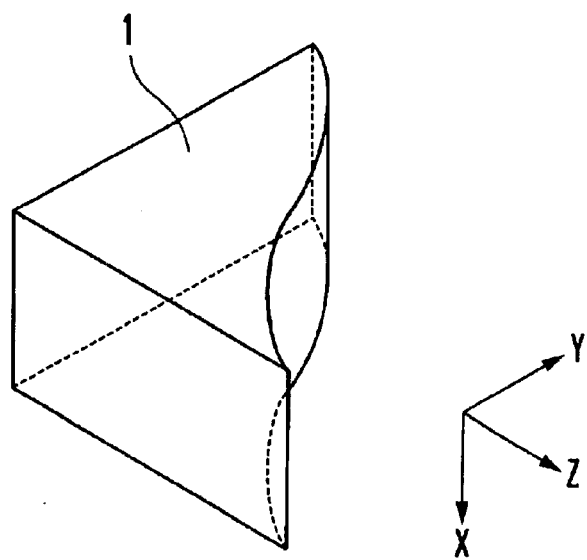
FIG. 10 is a perspective view of the first prism in the first embodiment of the invention.

The first prism 1 is a triangular prism including an entrance surface 11 (R9) arranged to transmit a light flux coming from the objective lens OL and a transmission surface 12 (R10) disposed at an acute angle with the entrance surface 11. The second prism 2 includes an entrance surface 21 (R11) disposed with a minute interval put between vertexes of the transmission surface 12 of the first prism 1 and the entrance surface 21 and arranged to allow a light flux coming from the transmission surface 12 to enter the entrance surface 21, a roof reflecting surface 22 (R12, R31) arranged to reflect a light flux coming from the entrance surface 21 toward the entrance surface 21, a total-reflection surface 21a (R14) provided at a part of the entrance surface 21 and arranged to totally reflect a light flux coming from the roof reflecting surface 22, and an exit surface 23 (R15) having a refractive power and arranged to allow a light flux coming from the total-reflection surface 21a to exit to the primary image forming plane. The transmission surface 12 and the entrance surface 21 are decentered with respect to the reference axis, and are disposed with a minute air gap put between their vertexes. The transmission surface 12 (R10) is provided with a rotationally-asymmetrical aspheric surface, whereby decentering aberration occurring between the transmission surface 12 and the entrance surface 21 is corrected well. In FIG. 9, there is shown an enlarged view of the first prism 1 within the Y-Z plane in the first embodiment. In FIG. 10, there is shown a perspective view of the first prism 1 in the first embodiment. The reflecting member 3 is arranged to reflect a light flux coming from the primary image famine plane to lead the reflected light flux to the eyepiece lens EL.

FIGS. 11(A), 11(B) and 11(C) are diagrams showing various transverse aberration curves at a wide-angle end, a middle focal length position and a telephoto end, respectively, in a case where the first prism 1 and the second prism 2 employed in the first embodiment are replaced with undecentered prisms having equivalent optical path lengths. In each of FIGS. 1ø(A), 1ø(B) and 1ø(C), there are shown transverse aberrations of an off-axial light flux passing through the pupil plane at the angles of Y=10.7°, −10.7°, 6.3° and −6.3° with respect to a central light flux of the angle of Y=0°.

FIGS. 12(A), 12(B) and 12(C) are diagrams showing various transverse aberration curves at a wide-angle end, a middle focal length position and a telephoto end, respectively, in a case where no rotationally-asymmetrical aspheric surface is provided in the image inverting unit in the first embodiment. A light flux having a large area when passing through the air gap causes aberration due to the variation of passage positions of a marginal light flux. In FIGS. 12(A), 12(B) and 12(C), coma varies as compared with that of the undecentered optical system shown in FIGS. 11(), 11(B) and 11(C). Further, in the case of an off-axial light flux, the amount of occurrence of aberration varies depending upon the passage position of the light flux. In FIGS. 12(A), 12(B) and 12(C), when a comparison is made between the aberration curves obtained at the time of the angle of Y=10.7° and at the time of the angle of Y=−10.7°, or the aberration curves obtained at the time of the angle of Y=6.3° and at the time of the angle of ad Y=−6.3°, it is apparent that coma is not symmetrical, unlike that in the undecentered optical system shown in FIGS. 11(A), 11(B) and 11(C). Thus, a viewfinder image is not viewed symmetrically in the upper and lower portions or the right and left portions of a field of view, so that the viewfinder optical system is deteriorated.

FIGS. 13(A), 13(B) and 13(C) are diagrams showing various transverse aberration curves at a wide-angle end, a middle focal length position and a telephoto end, respectively, in the first embodiment. The transmission surface 12 (R10) of the first prism 1 is provided with a rotationally-asymmetrical aspheric surface. The surface R10 is a surface having different aspheric shapes between the plus-side portion and the minus-side portion in the direction of the Y axis with respect to the optical axis within the Y-Z plane in FIG. 1. Further, the surface R10 has no curvature in the direction of the X axis. By providing such a surface, it is possible to suppress decentering aberration occurring due to the difference of the passage position of a light flux incident on the air gap within the Y-Z plane, so that a good viewfinder image can be viewed symmetrically in the upper and lower portions or the right and left portions of a field of view.

Figure 2:
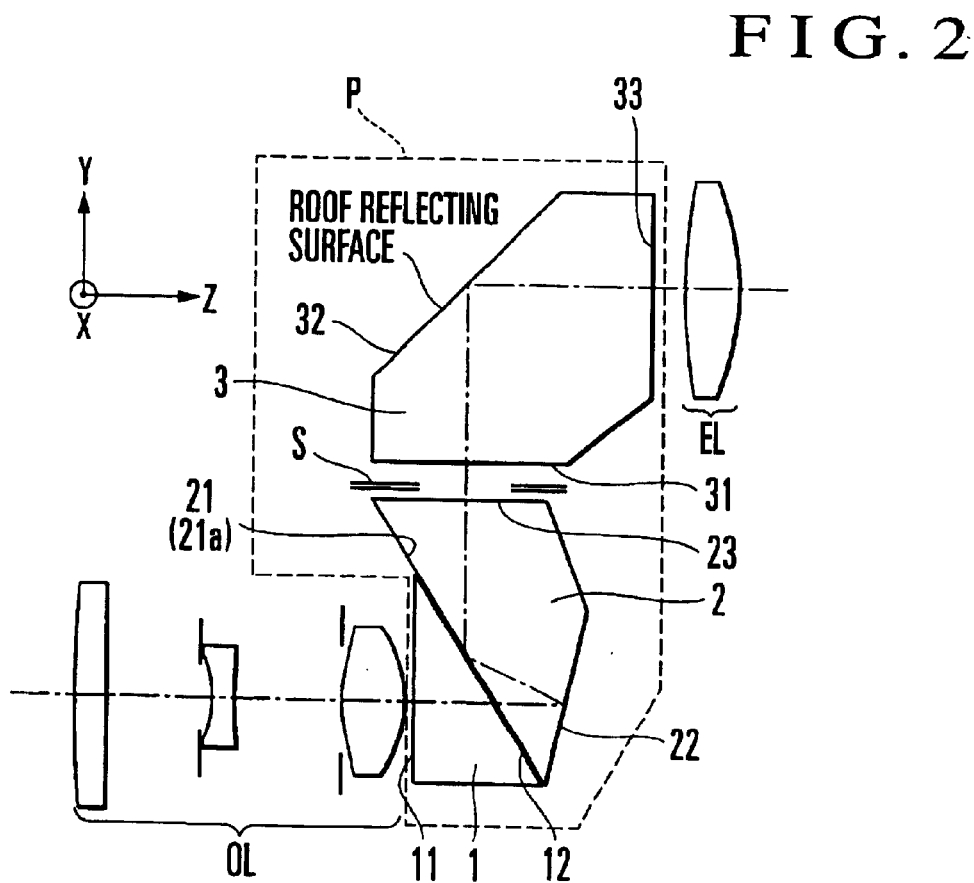
FIG. 2 is a sectional view showing essential parts of a viewfinder optical system according to a second embodiment of the invention.

FIG. 2 is a sectional view showing essential parts, within the Y-Z plane, of a viewfinder optical system according to a second embodiment of the invention.

Referring to FIG. 2, in the second embodiment, the first prism 1 (second transparent body) is a triangular prism including an entrance surface 11 (R9) arranged to transmit a light flux coming from the en objective lens OL and a transmission surface 12 (R10) disposed at an acute angle with the entrance surface 11. The second prism 2 (first transparent body) includes an entrance surface 21 (R11) disposed with a minute interval put between vertexes of the transmission surface 12 of the first prism 1 and the entrance surface 21 and arranged to allow a light flux coming from the transmission surface 12 to enter the entrance surface 21, a reflecting surface 22 (R12, R13) arranged to reflect a light flux coming from the entrance surface 21 toward the entrance surface 21, a total-reflection surface 21a (R14) provided at a part of the entrance surface 21 and arranged to totally reflect a light flux coming from the reflecting surface 22, and an exit surface 23 (R15) arranged to allow a light flux coming from the total-reflection surface 21a to exit to the primary image forming plane. The transmission surface 12 and the entrance surface 21 are decentered with respect to the reference axis, and are disposed with a minute air gap put between their vertexes. The transmission surface 12 (R10) is provided with a rotationally-asymmetrical aspheric surface as shown in FIG. 10, whereby decentering, aberration occurring between the transmission surface 12 and the entrance surface 21 is corrected well.

The reflecting member 3 includes an entrance surface 31 arranged to allow a light flux coming from the exit surface 23 of the second prism 2 to enter the entrance surface 31, a roof reflecting surface 32 arranged to reflect a light flux coming from the entrance surface 31, and an exit surface 33 arranged to reflect a light flux coming from the roof reflecting surface 32 to lead the reflected light flux to the eyepiece lens EL.

Figure 3:
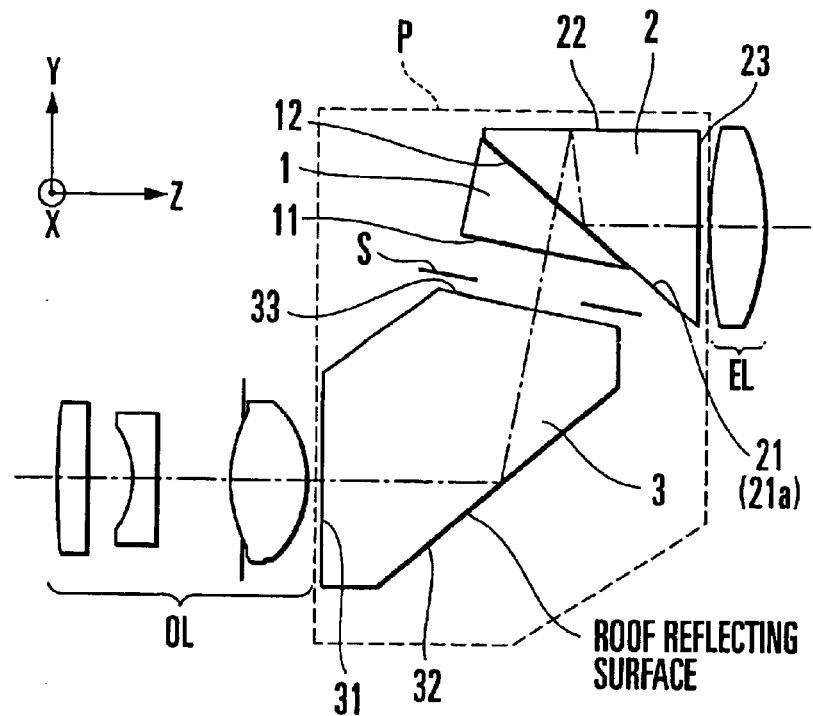
FIG. 3 is a sectional view showing essential parts of a viewfinder optical system according to a third embodiment of the invention.

FIG. 3 is a sectional view showing essential parts, within the Y-Z plane, of a viewfinder optical system according to a third embodiment of the invention.

Referring to FIG. 3, in the third embodiment, the reflecting member 3 includes an entrance surface 31 arranged to allow a light flux coming from the objective lens OL to enter the entrance surface 31, a roof reflecting surface 32 arranged to reflect a light flux coming from the entrance surface 31, and an exit surface 33 arranged to allow a light flux coming from the roof reflecting surface 32 to exit. A primary image forming plane on which an object image is formed by the objective lens OL is located in the vicinity of the exit surface 33.

The first prism 1 (second transparent body) is a triangular prism including an entrance surface 11 arranged to transmit a light flux coming from the reflecting member 3 and a transmission surface 12 disposed at an acute angle with the entrance surface 11. The second prism 2 (first transparent body) includes an entrance surface 21 disposed with a minute interval put between vertexes of the transmission surface 12 of the first prism 1 and the entrance surface 21 and arranged to allow a light flux coming from the transmission surface 12 to enter the entrance surface 21, a reflecting surface 22 arranged to reflect a light flux coming from the entrance surface 21 toward the entrance surface 21, a total-reflection surface 21a provided at a part of the entrance surface 21 and arranged to totally reflect a light flux coming from the reflecting surface 22, and an exit surface 23 arranged to allow a light flux coming from the total-reflection surface 21a to exit. The transmission surface 12 and the entrance surface 21 are decentered with respect to the reference axis, and are disposed with a minute air gap put between their vertexes. The transmission surface 12 is provided with a rotationally-asymmetrical aspheric surface, whereby decentering aberration occurring between the transmission surface 12 and the entrance surface 21 is corrected well. A light flux coming from the exit surface 23 is led to the eyepiece lens EL. The shape of the first prism 1 in the third embodiment corresponds, for example, to that obtained by rotating the first prism 1 shown in FIG. 10 by about 180° counterclockwise around the Y axis and about 270° counterclockwise around the X axis.

Figure 4:
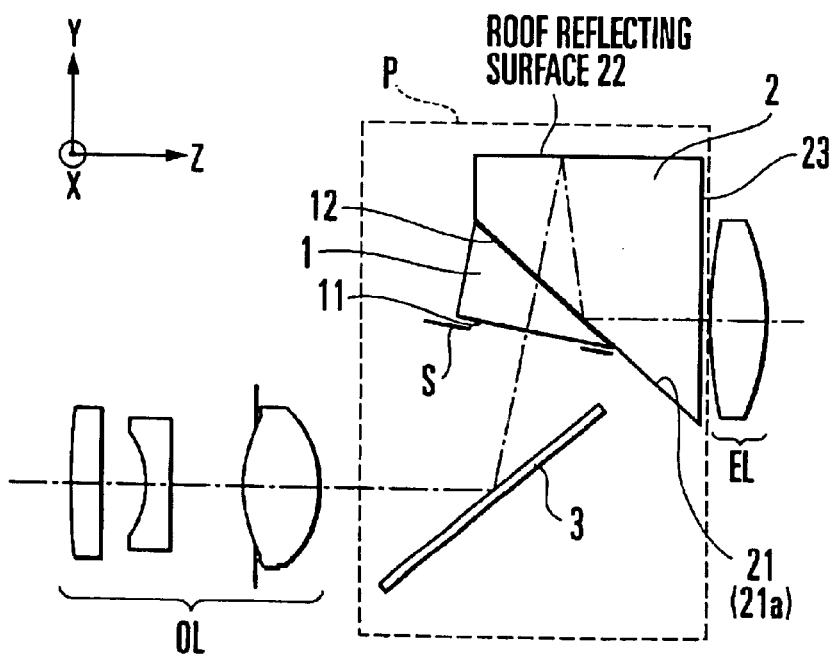
FIG. 4 is a sectional view showing essential parts of a viewfinder optical system according to a fourth embodiment of the invention.

FIG. 4 is a sectional view showing essential parts, within the Y-Z plane, of a viewfinder optical system according to a fourth embodiment of the invention.

Referring to FIG. 4, in the fourth embodiment, the reflecting member 3 is arranged to reflect a light flux coming from the objective lens OL to form an object image on a primary image forming plane S.

The first prism 1 (second transparent body) is a triangular prism including an entrance surface 11 arranged to transmit a light flux coming from the reflecting member 3 and a transmission surface 12 disposed at an acute angle with the entrance surface 11. The second prism 2 (first transparent body) includes an entrance surface 21 disposed with a minute interval put between vertexes of the transmission surface 12 and the entrance surface 21 and arranged to allow a light flux coming from the transmission surface 12 to enter the entrance surface 21, a roof reflecting surface 22 arranged to reflect a light flux coming from the entrance surface 21 toward the entrance surface 21, a total-reflection surface 21a provided at a part of the entrance surface 21 and arranged to totally reflect a light flux coming from the roof reflecting surface 22, and an exit surface 23 arranged to allow a light flux coming from the total-reflection surface 21a to exit to the eyepiece lens EL. The transmission surface 12 and the entrance surface 21 are decentered with respect to the reference axis, and are disposed with a minute air gap put between their vertexes. The transmission surface 12 is provided with a rotationally-asymmetrical aspheric surface, whereby decentering aberration occurring between the transmission surface 12 and the entrance surface 21 is corrected well. The shape of the first prism 1 in the fourth embodiment corresponds, for example, to that obtained by rotating the first prism 1 shown in FIG. 10 by about 180° counterclockwise around the Y axis and about 270° counterclockwise around the X axis.

Figure 5:
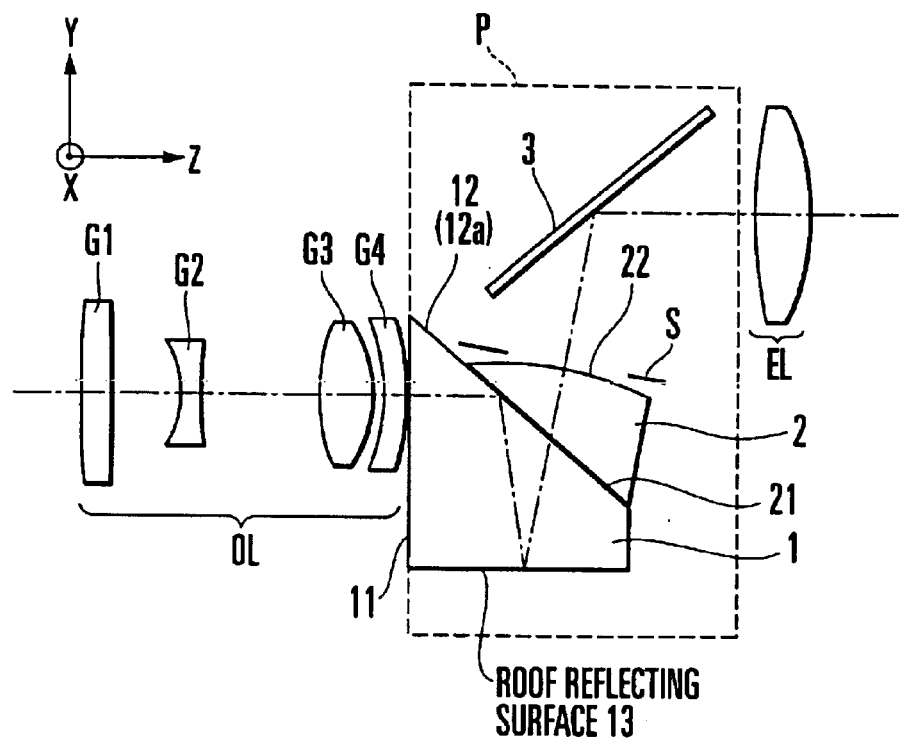
FIG. 5 is a sectional view showing essential parts of a viewfinder optical system according to a fifth embodiment of the invention.

FIG. 5 is a sectional view showing essential parts, within the Y-Z plane, of a viewfinder optical system according to a fifth embodiment (numerical example 2) of the invention.

In FIG. 5, reference character OL denotes an objective lens. The objective lens OL includes four lenses, i.e., a fixed positive lens G1, a negative lens G2 movable along the optical axis for variable magnification, a positive lens G3 for compensating for shift of an image plane due to the variation of magnification, and a fixed positive lens G4. Reference character P denotes an image inverting unit for obtaining a non-inverted erecting image. The image inverting unit P includes a first prism 1 (first transparent body), a second prism 2 (second transparent body) and a reflecting member 3. Reference character S denotes a field frame for limiting a viewfinder field. The field frame S is disposed at the position of a primary image forming plane on which an object image is formed by the objective lens OL, or disposed in the vicinity of the primary image forming plane. A viewfinder image as a real image by the objective lens OL is formed on the primary image forming plane in the vicinity of the field frame S through the first prism 1 and the second prism 2. Reference character EL denotes an eyepiece lens. The eyepiece lens EL allows the viewfinder image formed in the vicinity of the field frame S to be observed through the reflecting member 3.

Next, the first and second prisms 1 and 2 and the reflecting member 3, which constitute the image inverting unit P in the fifth embodiment, are described.

The first prism 1 includes an entrance surface 11 (R11) arranged to transmit a light flux coming from the objective lens OL, a total-reflection surface 12 (R12) arranged to totally reflect a light flux coming from the entrance surface 11, a roof reflecting surface 13 (R13, R14) arranged to reflect a light flux coming from the total-reflection surface 12 toward the total-reflection surface 12, and an exit surface 12a (R15) provided at a part of the total-reflection surface 12 and arranged to allow a light flux coming from the roof reflecting surface 13 to exit. The second prism 2 is a triangular prism including an entrance surface 21 (R16) disposed with a minute interval put between vertexes of the exit surface 12a and the entrance surface 21 and arranged to allow a light flux coming from the exit surface 12a to enter the entrance surface 21, aid a transmission surface 22 (R17) having a refractive power, disposed at an acute angle with the entrance surface 21 and arranged to allow a light flux coming from the entrance surface 21 to exit to the primary image forming plane. The exit surface 12a and the entrance surface 21 are decentered with respect to the reference axis, and are disposed with a minute air gap put between their vertexes. The entrance surface 21 (R16) is provided with a rotationally-asymmetrical aspheric surface, whereby decentering aberration occurring between the exit surface 12a and the entrance surface 21 is corrected well. The reflecting member 3 is arranged to reflect a light flux coming from the primary image forming plane to lead the reflected light flux to the eyepiece lens EL. The shape of the second prism 2 in the fifth embodiment corresponds, for example, to that obtained by rotating the first prism 1 shown in FIG. 10 by about 180° counterclockwise around the Y axis and about 90° counterclockwise around the X axis.

FIGS. 14(A), 14(B) and 14(C) are diagrams showing various transverse aberration curves at a wide-angle end, a middle focal length position and a telephoto end, respectively, in a case where the first prism 1 and the second prism 2 employed in the fifth embodiment are replaced with undecentered prisms having equivalent optical path lengths. In each of FIGS. 14(A), 14(B) and 14(C), there are shown transverse aberrations of an off-axial light flux passing through the pupil plane at the angles of Y=10.7°, −10.7°, 6.3° and −6.3° with respect to a central light flux of the angle of Y=0°.

FIGS. 15(A), 15(B) and 15(C) are diagrams showing various transverse aberration curves at a wide-angle end, a middle focal length position and a telephoto end, respectively, in a case where no rotationally-asymmetrical aspheric surface is provided in the image inverting unit in the fifth embodiment. A light flux having a large area when passing through the air gap causes aberration due to the variation of passage positions of a marginal light flux. In FIGS. 15(A), 15(B) and 15(C), coma varies as compared with that of the undecentered optical system shown in FIGS. 14(A), 14(B) and 14(C). Further, in the case of an off-axial light flux, the amount of occurrence of aberration varies depending upon the passage position of the light flux. In FIGS. 15(A), 15(B) and 15(C), when a comparison is made between the aberration curves obtained at the time of the angle of Y=10.7° and at the time of the angle of Y=−10.7°, or the aberration curves obtained at the time of the angle of Y=6.3° and at the time of the angle Y=−6.3°, it is apparent that coma is not symmetrical, unlike that in the undecentered optical system shown in FIGS. 14(A), 14(B) and 14(C). Thus, a viewfinder image is not viewed symmetrically in the upper and lower portions or the right and left portions of a field of view, so that the viewfinder optical system is deteriorated.

FIGS. 16(A), 16(B) and 16(C) are diagrams showing various transverse aberration curves at a wide-angle end, a middle focal length position and a telephoto end, respectively, in the fifth embodiment. The entrance surface 21 (R16) of the second prism 2 is provided with a rotationally-asymmetrical aspheric surface. The surface R16 is a surface having different aspheric shapes between the plus-side portion and the minus-side portion in the direction of the Y axis with respect to the optical axis within the Y-Z plane in FIG. 5. Further, the surface R16 has no curvature in the direction of the X axis. By providing such a surface, it is possible to suppress decentering aberration occurring due to the difference of the passage position of a light flux incident on the air gap within the Y-Z plane, so that a good viewfinder image can be viewed symmetrically in the upper and lower portions or the right and left portions of a field of view.

Figure 6:
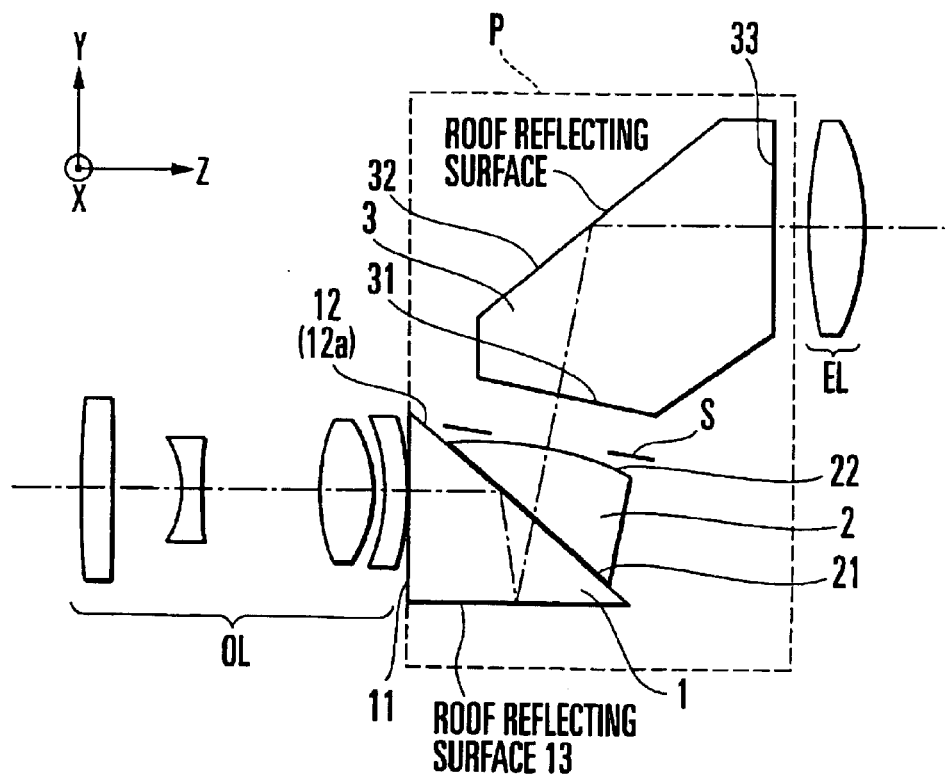
FIG. 6 is a sectional view showing essential parts of a viewfinder optical system according to a sixth embodiment of the invention.

FIG 6 is a sectional view showing essential parts, within the Y-Z plane, of a viewfinder optical system according to a sixth embodiment of the invention.

Referring to FIG. 6, in the sixth embodiment, the first prism 1 (first transparent body) includes an entrance surface 11 (R11) arranged to transmit a light flux coming from the objective lens OL, a total-reflection surface 12 (R12) arranged to totally reflect a light flux coming from the entrance surface 11, a roof reflecting surface 13 (R11, R14) arranged to reflect a light flux coming from the total-reflection surface 12 toward the total-reflection surface 12, and an exit surface 12a (R15) provided at a part of the total-reflection surface 12 and arranged to allow a light flux coming from the roof reflecting surface 13 to exit. The second prism 2 (second transparent body) is a triangular prism including an entrance surface 21 (R16) disposed with a minute interval put between vertexes of the exit surface 12a and the entrance surface 21 and arranged to allow a light flux coming from the exit surface 12a to enter the entrance surface 21, and a transmission surface 22 (R17) having a refractive power, disposed at an acute angle with the entrance surface 21 and arranged to allow a light flux coming from the entrance surface 21 to exit to the primary image forming plane. The exit surface 12a and the entrance surface 21 are decentered with respect to the reference axis, and are disposed with a minute air gap put between their vertexes. The entrance surface 21 (R16) is provided with a rotationally-asymmetrical aspheric surface, whereby decentering aberration occurring between the exit surface 12a and the entrance surface 21 is corrected well.

The reflecting member 3 includes an entrance surface 31 arranged to allow a light flux coming from the: exit surface 23 of the second prism 2 to enter the entrance surface 31, a roof reflecting surface 32 arranged to reflect a light flux coming from the entrance surface 31, and an exit surface 33 arranged to reflect a light flux coming from the roof reflecting surface 32 to lead the reflected light flux to the eyepiece lens EL. The shape of the second prism 2 in the sixth embodiment corresponds, for example, to that obtained by rotating the first prism 1 shown in FIG. 10 by about 180° counterclockwise around the Y axis and about 90° counterclockwise around the X axis.

Figure 7:
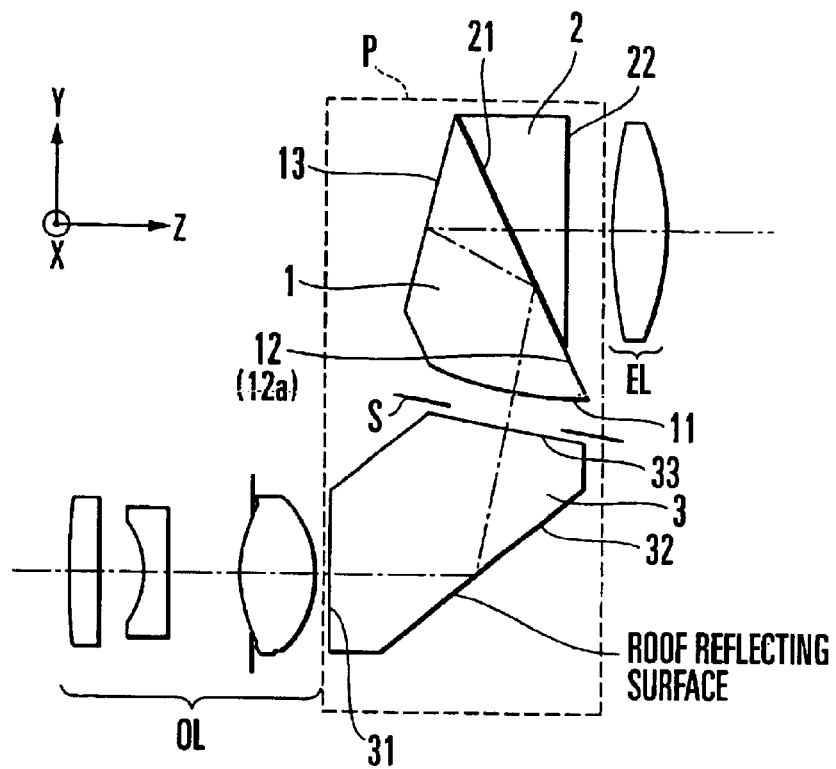
FIG. 7 is a sectional view showing essential parts of a viewfinder optical system according to a seventh embodiment of the invention.

FIG. 7 is a sectional view showing essential parts, within the Y-Z plane, of a viewfinder optical system according to a seventh embodiment of the invention.

Referring to FIG. 7, in the seventh embodiment, the reflecting member 3 includes an entrance surface 31 arranged to allow a light flux coming from the objective lens OL to enter the entrance surface 31, a roof reflecting surface 32 arranged to reflect a light flux coming from the entrance surface 31, and an exit surface 33 arranged to allow a light flux coming from the roof reflecting surface 32 to exit. A primary image forming plane on which an object image is formed by the objective lens OL is located in the vicinity of the exit surface 33.

The first prism 1 (first transparent body) includes an entrance surface 11 (R11) having a refractive power and arranged to transmit a light flux coming from the reflecting member 3, a total-reflection surface 12 arranged to totally reflect a light flux coming from the entrance surface 11, a reflecting surface 13 arranged to reflect a light flux coming from the total-reflection surface 12 toward the total-reflection surface 12, and an exit surface 12a provided at a part of the total-reflection surface 12 and arranged to allow a light flux coming from the reflecting surface 13 to exit. The second prism 2 (second transparent body) is a triangular prism including an entrance surface 21 disposed with a minute interval put between vertexes of the exit surface 12a and the entrance surface 21 and arranged to allow a light flux coming from the exit surface 12a to enter the entrance surface 21, and a transmission surface 22 disposed at an acute angle with the entrance surface 21 and arranged to allow a light flux coming from the entrance surface 21 to exit to the eyepiece lens EL. The exit surface 12a and the entrance surface 21 are decentered with respect to the reference axis, and are disposed with a minute air gap put between their vertexes. The entrance surface 21 is provided with a rotationally-asymmetrical aspheric surface, whereby decentering aberration occurring between the exit surface 12a and the entrance surface 21 is corrected well. The shape of the second prism 2 in the seventh embodiment corresponds, for example, to that obtained by rotating the first prism 1 shown in FIG. 10 by about 180° counterclockwise around the X axis.

Figure 8:
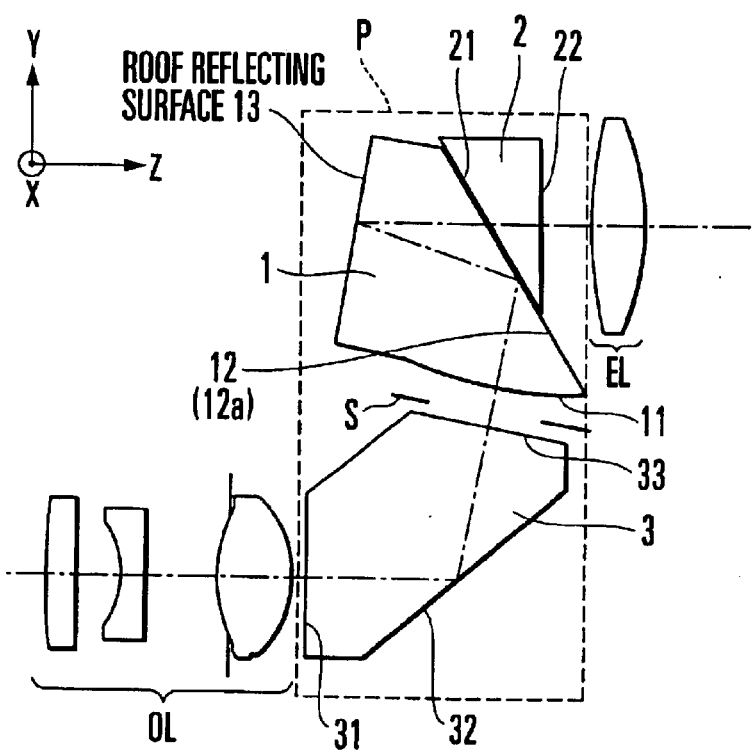

FIG. 8 is a sectional view showing essential parts, within the Y-Z plane, of a viewfinder optical system according to an eighth embodiment of the invention.

Referring to FIG. 8, in the eighth embodiment, the reflecting member 3 includes an entrance surface 31 arranged to allow a light flux coming from the objective lens OL to enter the entrance surface 31, a reflecting surface 32 arranged to reflect a light flux coming from the entrance surface 31, and an exit surface 33 arranged to allow a light flux coming from the reflecting surface 32 to exit. A primary image forming plane on which an object image is formed-by the objective lens OL is located in the vicinity of the exit surface 33.

The first prism 1 (first transparent body) includes an entrance surface 11 having a refractive power and arranged to transmit a light flux coming from the reflecting member 3, a total-reflection surface 12 arranged to totally reflect a light flux coming from the entrance surface 11, a roof reflecting surface 13 arranged to reflect a light flux coming from the total-reflection surface 12 toward the total-reflection surface 12, and an exit surface 12a provided at a part of the total-reflection surface 12 and arranged to allow a light flux coming from the roof reflecting surface 13 to exit. The second prism 2 (second transparent body) is a triangular prism including an entrance surface 21 disposed with a minute interval put between vertexes of the exit surface 12a and the entrance surface 21 and arranged to allow a light flux coming from the exit surface 12a to enter the entrance surface 21, and a transmission surface 22 disposed at an acute angle with the entrance surface 21 and arranged to allow a light flux coming from the entrance surface 21 to exit to the eyepiece lens EL. The exit surface 12a and the entrance surface 21 are decentered with respect to the reference axis, and are disposed with a minute air gap put between their vertexes. The entrance surface 21 is provided with a rotationally-asymmetrical aspheric surface, whereby decentering aberration occurring between the exit surface 12a and the entrance surface 21 is corrected well. The shape of the second prism 2 in the eighth-embodiment corresponds, for example, to that obtained by rotating the first prism 1 shown in FIG. 10 by about 180° counterclockwise around the X axis.

Figure 17:
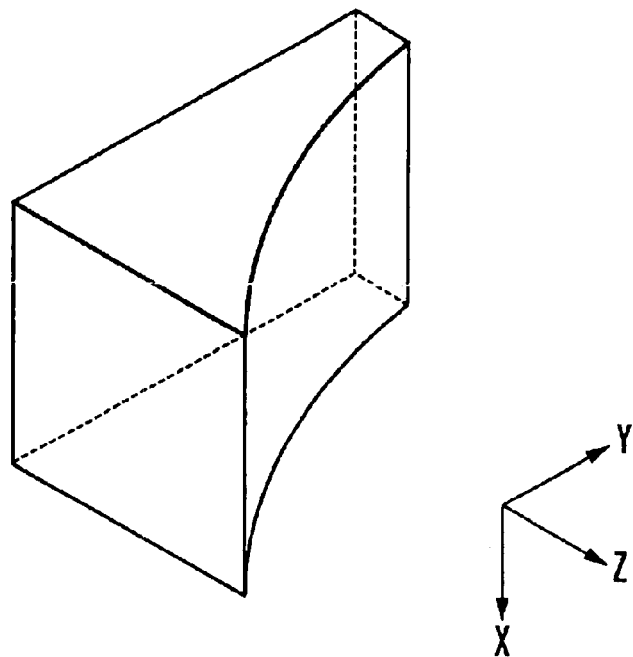
FIG. 17 is a perspective view of a prism having a cylindrical surface.
Figure 18:
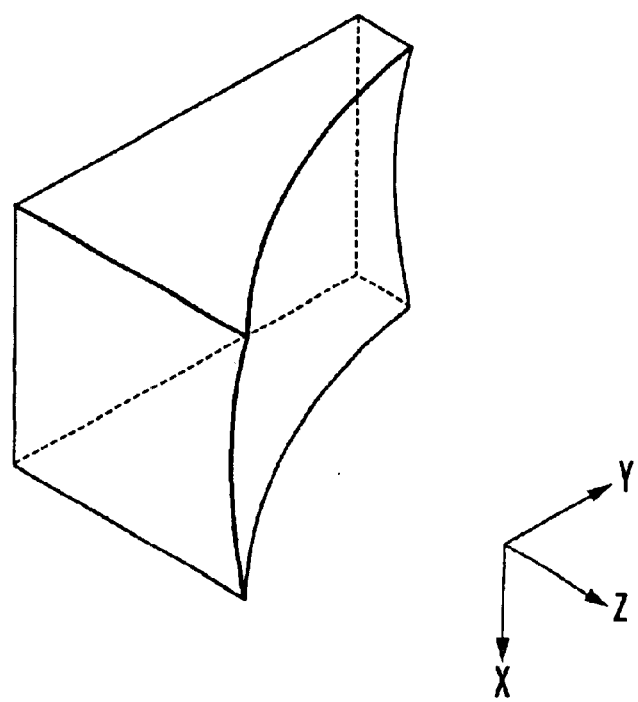
FIG. 18 is a perspective view of a prism having a toric surface.

As has been described above in the first to eighth embodiments of the invention, a surface for correcting decentering aberration is set on an aspheric surface having different curvatures between the plus-side portion and the minus-side portion in the direction of the Y axis and having no curvature in the direction of the x axis, for example, in the cases of the first and second embodiments. However, the shape of the decentering-aberration correcting surface is not limited to such a shape. For example, a cylindrical surface, such as that shown in FIG. 17, having a symmetrical curvature in the direction of the Y axis and having no curvature in the direction of the X axis may be employed. For example, a toric surface, such as that shown in FIG. 18, having respective different curvatures in the direction of the Y axis and the direction of the X axis may be employed. For example, a surface having no symmetrical shape in either of the direction of the Y axis and the direction of the X axis (a surface having no axis of rotational symmetry) may be employed. Thus, it is desirable to adaptively set such a shape as to correct decentering aberration, according to the position of the air gap and the amount of decentering.

Figure 19:
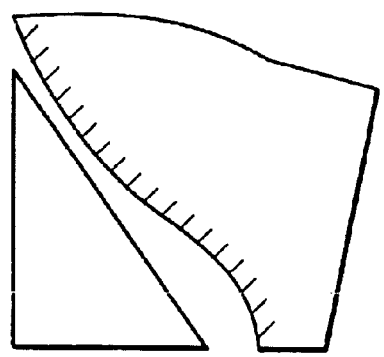
FIG. 19 is a sectional view showing a portion having a rotationally-asymmetrical surface in a prism according to a modification example of each embodiment of the invention.
Figure 20:
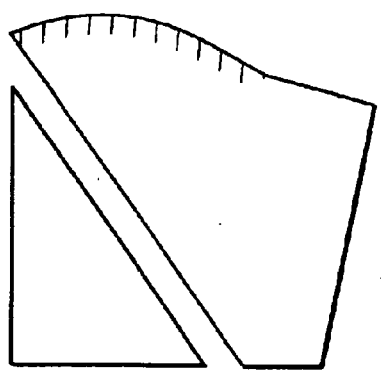
FIG. 20 is a sectional view showing a portion having a rotationally-asymmetrical surface in a prism according to another modification example of :each embodiment of the invention.
Figure 21:
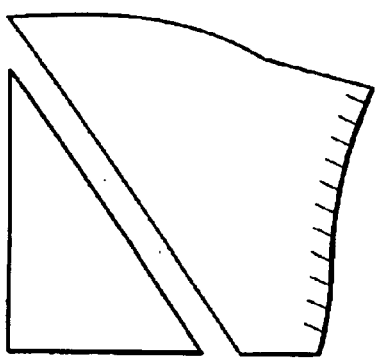
FIG. 21 is a sectional view showing a portion having a rotationally-asymmetrical surface in a prism according to a further modification example of each embodiment of the invention.

Further, as described above, a rotationally-asymmetrical aspheric surface (a surface for correcting decentering aberration) is provided on a surface of the first prism adjacent to the air gap, in each of the first to fourth embodiments, and on a surface of the second prism adjacent to the air gap, in each of the fifth to eighth embodiments. However, in place of the above surface, the rotationally-asymmetrical aspheric surface may be provided on any one of surfaces constituting the image inverting unit. For example, when the rotationally-asymmetrical aspheric surface is provided on a surface as shown in FIG. 19, 20 or 21, the same advantageous effect as that in each of the above-described embodiments can be obtained.

In the following, numerical data of a numerical example 1 corresponding to the first embodiment of the invention is shown. In the numerical data of the numerical example 1, the notation "E-0X" means "$\times 10^{-x}$".

Numerical Example 1:
$2\omega=48.7°-28.4° \gamma=0.47-0.84$

| i | Ri | Di | Ni | vi | θyi | θxi |
|---|---|---|---|---|---|---|
| 1 | rotationally-symmetrical aspheric surface | 1.50 | 1.49171 | 57.40 | | |
| 2 | −200.00 | variable | air | | | |
| 3 | stop | 0.60 | air | | | |
| 4 | rotationally-symmetrical aspheric surface | 1.00 | 1.58306 | 30.23 | | |
| 5 | 26.64 | variable | air | | | |
| 6 | stop | 0.00 | air | | | |
| 7 | rotationally-symmetrical aspheric surface | 3.00 | 1.49171 | 57.40 | | |
| 8 | rotationally-symmetrical aspheric surface | variable | air | | | |
| 9 | plane | 2.55 | 1.57090 | 33.80 | | |
| 10 | rotationally-asymmetrical aspheric surface | 0.05 | air | | 30.00 | |
| 11 | plane | 6.34 | 1.57090 | 33.80 | 30.00 | |
| 12 | plane | 0.00 | 1.57090 | 33.80 | −9.54 | 45.00 |
| 13 | plane | 8.39 | 1.57090 | 33.80 | −9.54 | −45.00 |
| 14 | plane | 5.63 | 1.57090 | 33.80 | 49.07 | |
| 15 | −19.00 | 0.50 | air | | | |
| 16 | field frame | 7.31 | air | | | |
| 17 | reflecting surface | 8.11 | air | | 39.54 | |
| 18 | rotationally-symmetrical aspheric surface | 2.70 | 1.49171 | 57.40 | | |
| 19 | −12.97 | 15.00 | air | | | |
| 20 | pupil | | | | | |

Variable Separation According to Focal Length

| | wide-angle end | middle | telephoto end |
|---|---|---|---|
| D2 | 4.64 | 2.97 | 0.49 |
| D5 | 4.93 | 3.14 | 2 15 |
| D8 | 0.18 | 3.65 | 7.11 |

Shape of Rotationally-symmetrical Aspheric Surface

| | R1 | R4 | R7 | R8 | R18 |
|---|---|---|---|---|---|
| R | 0.00 | −4.72 | 7.97 | −5.80 | 23.81 |
| k | 8.39E + 03 | −1.73E + 00 | 4.17E − 01 | −3.71E − 01 | 1.01E + 00 |
| B | 1.93E − 04 | −4.15E − 04 | −1.49E − 03 | 3.07E − 04 | −1.30E − 04 |
| C | −3.38E − 06 | −3.66E − 04 | 3.18E − 05 | 9.85E − 06 | 1.70E − 07 |
| D | 7.52E − 08 | 6.05E − 05 | −1.21E − 06 | −3.68E − 07 | 0.00E + 00 |

Shape of Rotationally-asymmetrical Aspheric Surface

| r11 | 0.00 | r21 | 2.00E + 03 |
|---|---|---|---|
| k11 | 0.00 | k21 | 0.00 |
| B11 | 0.00 | B21 | −1.00E − 05 |
| C11 | 0.00 | C21 | 0.00 |
| D11 | 0.00 | D21 | 0.00 |
| r12 | 0.00 | r22 | 2.00E + 03 |
| k12 | 0.00 | k22 | 0.00 |
| B12 | 0.00 | B22 | 1.00E − 05 |
| C12 | 0.00 | C22 | 0.00 |
| D12 | 0.00 | D22 | 0.00 |

In the following, numerical data of a numerical example 2 corresponding to the fifth embodiment of the invention is shown. In the numerical data of the numerical example 2, the notation "E-0X" means "$\times 10^{-x}$".

Numerical Example 2:
$2\omega=48.7°-28.4° \gamma=0.47-0.84$

| i | Ri | Di | Ni | vi | θyi | θxi |
|---|---|---|---|---|---|---|
| 1 | rotationally-symmetrical aspheric surface | 1.50 | 1.49171 | 57.40 | | |
| 2 | −200.00 | variable | air | | | |
| 3 | stop | 0.60 | air | | | |
| 4 | rotationally-symmetrical aspheric surface | 1.00 | 1.58306 | 30.23 | | |
| 5 | 37.94 | variable | air | | | |
| 6 | stop | 0.00 | air | | | |
| 7 | rotationally-symmetrical aspheric surface | 2.60 | 1.49171 | 57.40 | | |
| 8 | rotationally-symmetrical aspheric surface | variable | air | | | |
| 9 | rotationally-symmetrical aspheric surface | 1.10 | 1.58306 | 30.23 | | |

-continued

| i | Ri | Di | Ni | νi | θyi | θxi |
|---|---|---|---|---|---|---|
| 10 | −12.62 | 0.20 | air | | | |
| 11 | plane | 5.63 | 1.57090 | 33.80 | | |
| 12 | plane | 8.39 | 1.57090 | 33.80 | −49.07 | |
| 13 | plane | 0.00 | 1.57090 | 33.80 | 9.54 | 45.00 |
| 14 | plane | 6.34 | 1.57090 | 33.80 | 9.54 | −45.00 |
| 15 | plane | 0.05 | air | | −30.00 | |
| 16 | rotationally-asymmetrical aspheric surface | 2.55 | 1.57090 | 33.80 | −30.00 | |
| 17 | −19.50 | 0.50 | air | | | |
| 18 | field frame | 7.31 | air | | | |
| 19 | reflecting surface | 8.11 | air | | 39.54 | |
| 20 | rotationally-symmetrical aspheric surface | 2.70 | 1.49171 | 57.40 | | |
| 21 | −12.97 | 15.00 | air | | | |
| 22 | pupil | | | | | |

Variable Separation According to Focal Length

| | wide-angle end | middle | telephoto end |
|---|---|---|---|
| D2 | 2.62 | 2.54 | 0.61 |
| D5 | 5.87 | 4.60 | 2.48 |
| D8 | 0.51 | 1.86 | 5.90 |

Shape of Rotationally-symmetrical Aspheric Surface

| | R1 | R4 | R7 | R8 | R9 | R20 |
|---|---|---|---|---|---|---|
| R | 0.00 | −4.72 | 8.04 | −5.59 | −10.00 | 23.81 |
| k | 3.94E + 01 | −1.80E + 00 | 3.28E − 01 | −3.92E − 01 | 3.09E − 01 | 1.01E + 00 |
| B | 4.28E − 04 | −1.22E − 03 | −1.19E − 03 | 5.30E − 04 | 1.28E − 04 | −1.30E − 04 |
| C | 1.70E − 07 | −2.49E − 04 | 3.66E − 05 | 1.64E − 05 | −2.10E − 06 | 1.70E − 07 |
| D | 3.68E − 08 | 3.63E − 05 | −1.63E − 06 | −6.71E − 07 | −5.02E − 08 | 0.00E + 00 |

Shape of Rotationally-asymmetrical Aspheric Surface

| r11 | 0.00 | r21 | −1.00E + 02 |
|---|---|---|---|
| k11 | 0.00 | k21 | 0.00 |
| B11 | 0.00 | B21 | 1.00E − 04 |
| C11 | 0.00 | C21 | 3.00E − 06 |
| D11 | 0.00 | D21 | 0.00 |
| r12 | 0.00 | r22 | 0.00 |
| k12 | 0.00 | k22 | 0.00 |
| B12 | 0.00 | B22 | 0.00 |
| C12 | 0.00 | C22 | 0.00 |
| D12 | 0.00 | D22 | 0.00 |

Next, ninth to thirteenth embodiments of the invention are described with reference to FIGS. 22 to 27.

Figure 22:
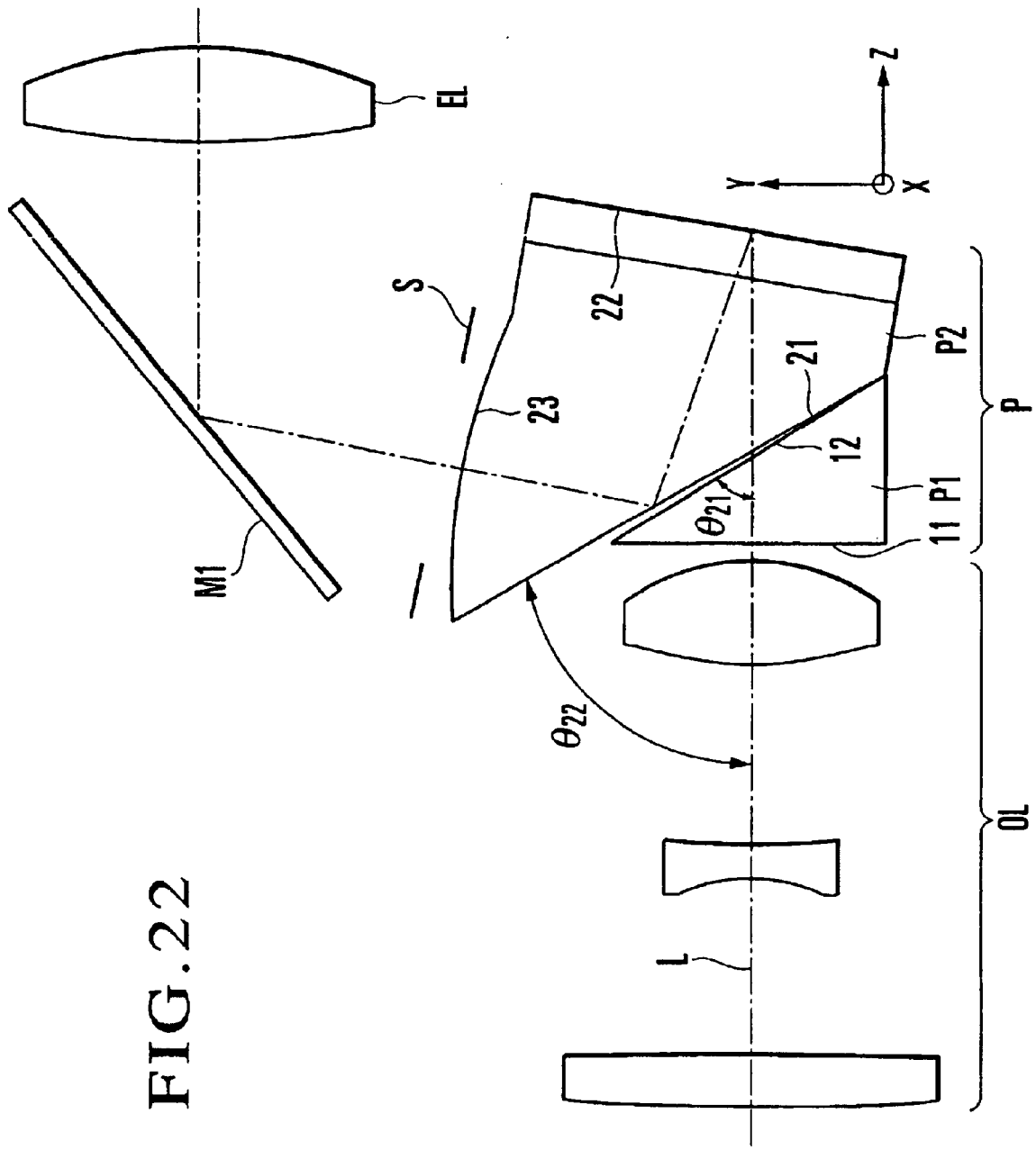
FIG. 22 is a sectional view showing essential parts of a viewfinder optical system of the real image type according to a ninth embodiment of the invention.

FIG. 22 is a sectional view showing essential parts of a viewfinder optical system of the real image type according to the ninth embodiment of the invention. In FIG. 22, reference character OL denotes an objective lens, and reference character P denotes a prism for obtaining a non-inverted erecting image. The prism P is composed of a first prism P1 and a second prism (roof prism) P2. The first prism P1 and the second prism P2 are disposed with a minute air gap put between an exit surface 12 of the first prism P1 and an entrance surface 21 of the second prism P2. Reference character S denotes a field frame for limiting a viewfinder field. The field frame S is preferably disposed in the vicinity of an exit surface 23 of the second prism P2 (on a primary image forming plane), and may be a mechanical part or may be formed by using a light-transmission limiting pattern forming means, such as a liquid crystal element. The second prism P2 is shaped such that a light flux reflected from a roof surface 22 is made incident on the entrance surface 21 of the second prism P2 at such an angle to enable the light flux to be totally reflected at the entrance surface 21. Reference character EL denotes an eyepiece lens, which is used for observing a non-inverted erecting viewfinder image formed in the vicinity of the field frame S. A reflecting member M1 is arranged to reflect a light flux coming from the primary image forming plane to lead the reflected light flux to the eyepiece lens EL.

In the construction shown in FIG. 22, a light flux coming from the objective lens OL passes through the exit surface 12 of the first prism P1 and the entrance surface 21 of the second prism P2 and is then image-inverted and reflected once toward the object side by the roof reflecting surface 22. The reflected light flux is further totally-reflected by the entrance surface 21 of the second prism P2; so that a viewfinder image is formed on the primary image forming plane in the vicinity of the exit surface 23 of the second prism P2. A viewfinder image formed as an inverted real image by the objective lens OL is converted, through the second prism P2, into a non-inverted erecting viewfinder image, which is formed in the vicinity of the field frame S. A light flux coming from the primary image forming plane is reflected by the reflecting member M1 to be led to the eyepiece lens EL.

Figure 23:
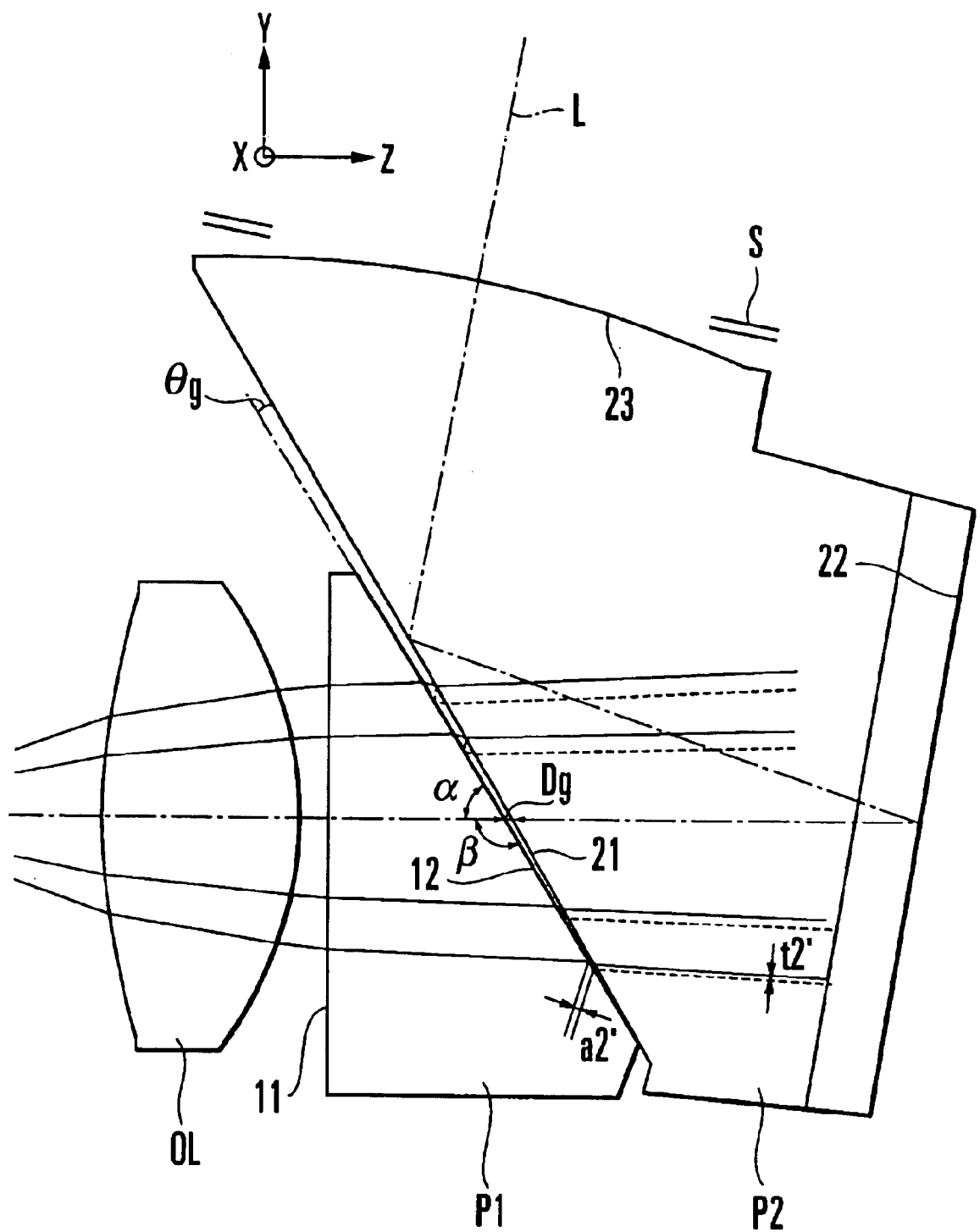
FIG. 23 is a sectional view showing the disposition of two prisms of the viewfinder optical system of the real image type shown in FIG. 22.
Figure 32:
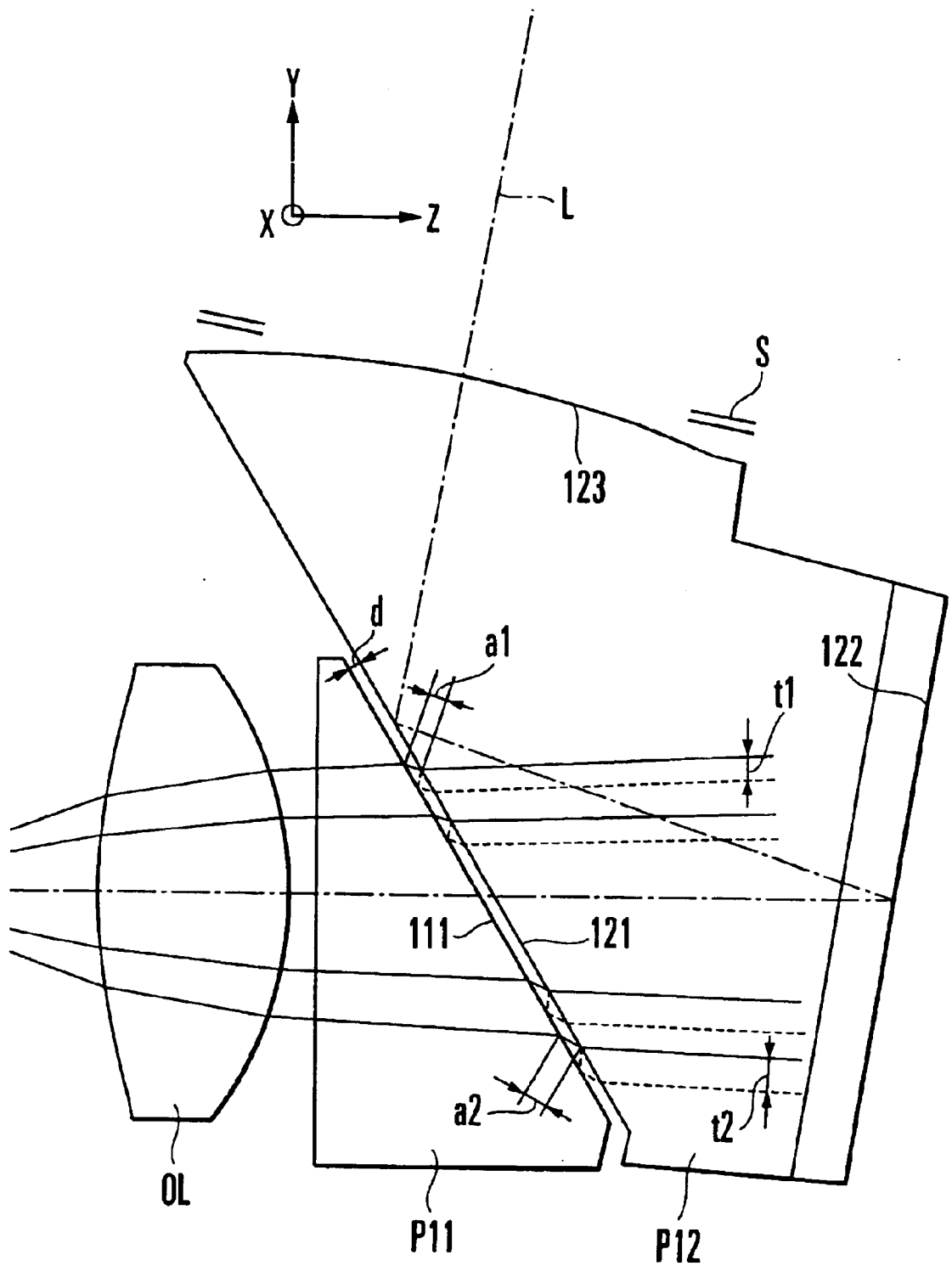
FIG. 32 is a sectional view for explaining ghost or a difference in optical path length occurring in a minute air gap of the conventional viewfinder optical system of the real image type shown in FIG. 31.

The exit surface 12 of the first prism P1 and the entrance surface 21 of the second prism P2 are disposed in such a way that the minute air gap therebetween is in a wedge shape, as shown in FIG. 23, i.e., in such a shape that the interval between the exit surface 12 and the entrance surface 21 varies monotonically. By this disposition, the width t2 (see FIG. 32) of a double image can be more reduced to a width t2' (t2>>t2'), as indicated by dashed lines in FIG. 23.

Further, as rays of light indicated by solid lines in FIG. 23, the optical path length a2 (see FIG. 32) in the minute air gap is more reduced to a length a2' (a2>>a2'). Accordingly, it is possible to suppress the variation of aberration occurring at the pupil plane due to the difference in optical path length from the exit surface of the first prism P1 to the pupil plane between right and left sides of a view field, so that a good viewfinder image can be observed. In particular, it is preferred that the minute air gap is formed in a wedge shape in the Y-Z plane in which the first prism P1 and the second prism P2 are decentered.

More preferably, the wedge-shaped minute air gap becomes narrower toward a portion on a side of the larger one of angles which the reference axis ray makes with the minute air gap in the Y-Z plane, so that decentering aberration can be most effectively corrected. Referring to FIG. 23, of angles α and β which the reference axis ray makes with the exit surface 12 of the first prism P1, the larger one is the angle β on the minus side almost in the direction of the Y axis. Therefore, the first prism P1 and the second prism P2 are disposed such that the air gap becomes wider toward the apical angle of the first prism P1.

Figure 24:
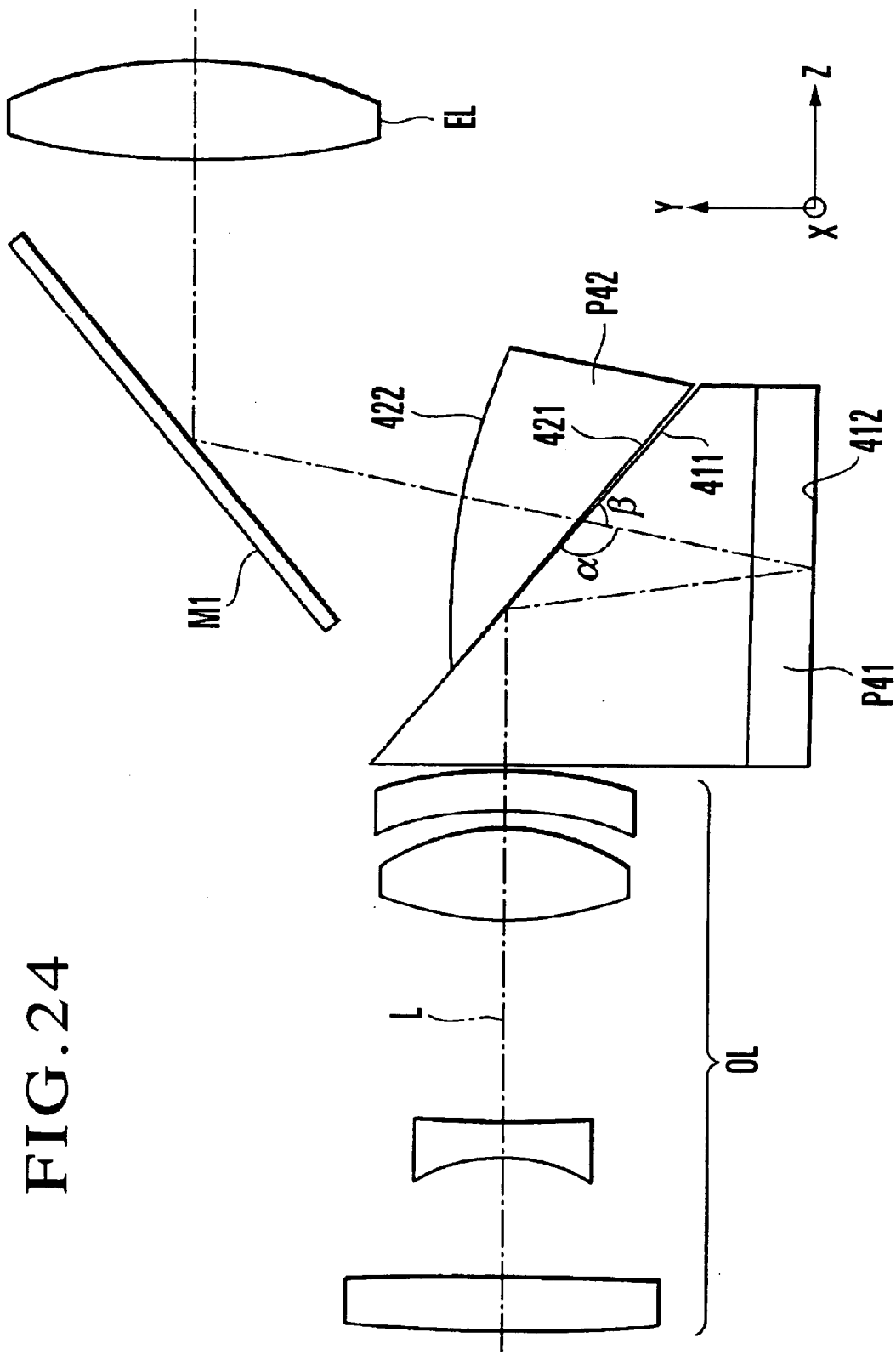
FIG. 24 is a sectional view showing essential parts of a viewfinder optical system according to a tenth embodiment of the invention, in which the positions of the two prisms in the ninth embodiment shown in FIG. 22 are interchanged.

Further, in a viewfinder optical system of the real image type shown in FIG. 24, which is the tenth embodiment of the invention, the image inversion is performed in the first prism P41. A light flux coming from the objective lens OL is made to enter the first prism P41 and is then totally reflected by an exit surface 411 of the first prism P41 to be led downward to a roof reflecting surface 412. A light flux reflected upward by the roof reflecting surface 412 is made to exit from the exit surface 411 of the first prism P41 and then passes through an entrance surface 421 of the second prism P42. The exit surface 411 of the first prism P41 and the entrance surface 421 of the second prism P42 are disposed in such a way as to form a wedge-shaped minute air gap therebetween which becomes narrower toward the apical angle of the second prism P42. The light flux passing through the entrance surface 421 of the second prism P42 is imaged to form a viewfinder image on a primary image forming plane in the vicinity of an exit surface 422 of the second prism P42.

In the viewfinder optical system shown in FIG. 24, of angles α and β which the reference axis ray L makes with the exit surface 411 of the first prism P41, the larger one is the angle α on the minus side almost in the direction of the Z axis. Therefore, the above-described disposition is adopted.

Figure 25:
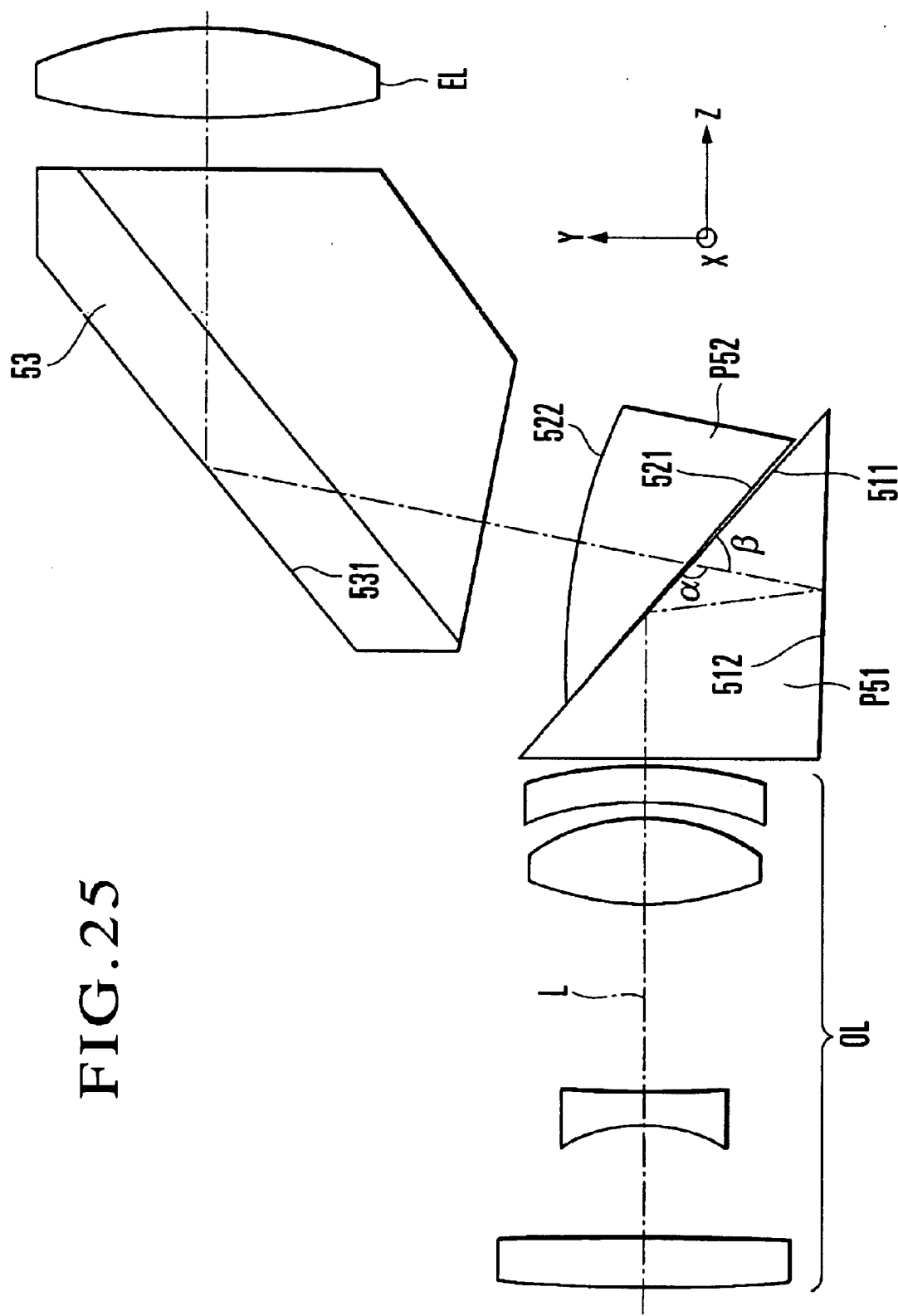
FIG. 25 is a sectional view showing essential parts of a viewfinder optical system according to an eleventh embodiment of the invention, in which an image inverting unit is disposed separately from a prism in the tenth embodiment shown in FIG. 24.

Also, in a viewfinder optical system of the real image type shown in FIG. 25, which is the eleventh embodiment of the invention, the same relationship in angle as in the viewfinder optical system shown in FIG. 24 exits in an exit surface 511 of the first prism P51. Referring to FIG. 25, a light flux coming from the objective lens OL is made to enter the first prism P51 and is then totally reflected by the exit surface 511 of the first prism P51 to be led downward to a reflecting surface 512 having vapor deposition or the like applied thereto. A light flux mirror-reflected upward by the reflecting surface 512 is made to exit from the exit surface 511 of the first prism P51 and then passes through an entrance surface 521 of the second prism P52. The exit surface 511 of the first prism P51 and the entrance surface 521 of the second prism P52 are disposed in such a way as to form a wedge-shaped minute air gap therebetween which becomes narrower toward the apical angle of the second prism P52. The light flux passing through the entrance surface 521 of the second prism P52 is imaged to form a viewfinder image on a primary image forming plane in the vicinity of an exit surface 522 of the second prism P52. A light flux bearing the viewfinder image is then reflected by a roof reflecting surface 531 of a pentagonal roof prism 53 to be led to the eyepiece lens EL.

Here, in order to make the minute air gap in a wedge shape, as shown in FIG. 22, when the entrance surface 11 of the first prism P1 is disposed perpendicular to the reference axis ray L, assuming that an acute angle which the exit surface 12 of the first prism P1 makes with the reference axis ray L is θ21 and an acute angle which the entrance surface 21 of the second prism P2 makes with the reference axis ray L is θ22, the respective angles of the first prism P1 and the second prism P2 may be set in such a way as to satisfy a condition of "θ21≠θ22". Alternatively, as long as the amount of decentering of the first prism P1 with respect to the optical axis of the entrance surface 21 is within a range in which decentering aberration is permissible, the entirety of the first prism P1 may be decentered minutely.

Next, the twelfth and thirteenth embodiments of the invention are described with reference to FIGS. 26 and 27.

In the ninth, tenth and eleventh embodiments shown in FIGS. 22, 24 and 25, two, the first and second, prisms disposed with a wedge-shaped minute air gap put therebetween are located on the object side of the primary image forming plane, i.e., closer to the objective lens OL than the primary image forming plane. On the other hand, in the twelfth and thirteenth embodiments, as shown in FIGS. 26 and 27, in order to set the optical path length from the primary image-forming plane to the eyepiece lens EL much short for the purpose of obtaining a desired viewfinder magnification and angle of field, the first and second prisms disposed with a wedge-shaped minute air gap put therebetween, are located on the pupil side of the primary image forming plane, i.e., closer to the eyepiece lens EL than the primary image forming plane.

Figure 26:
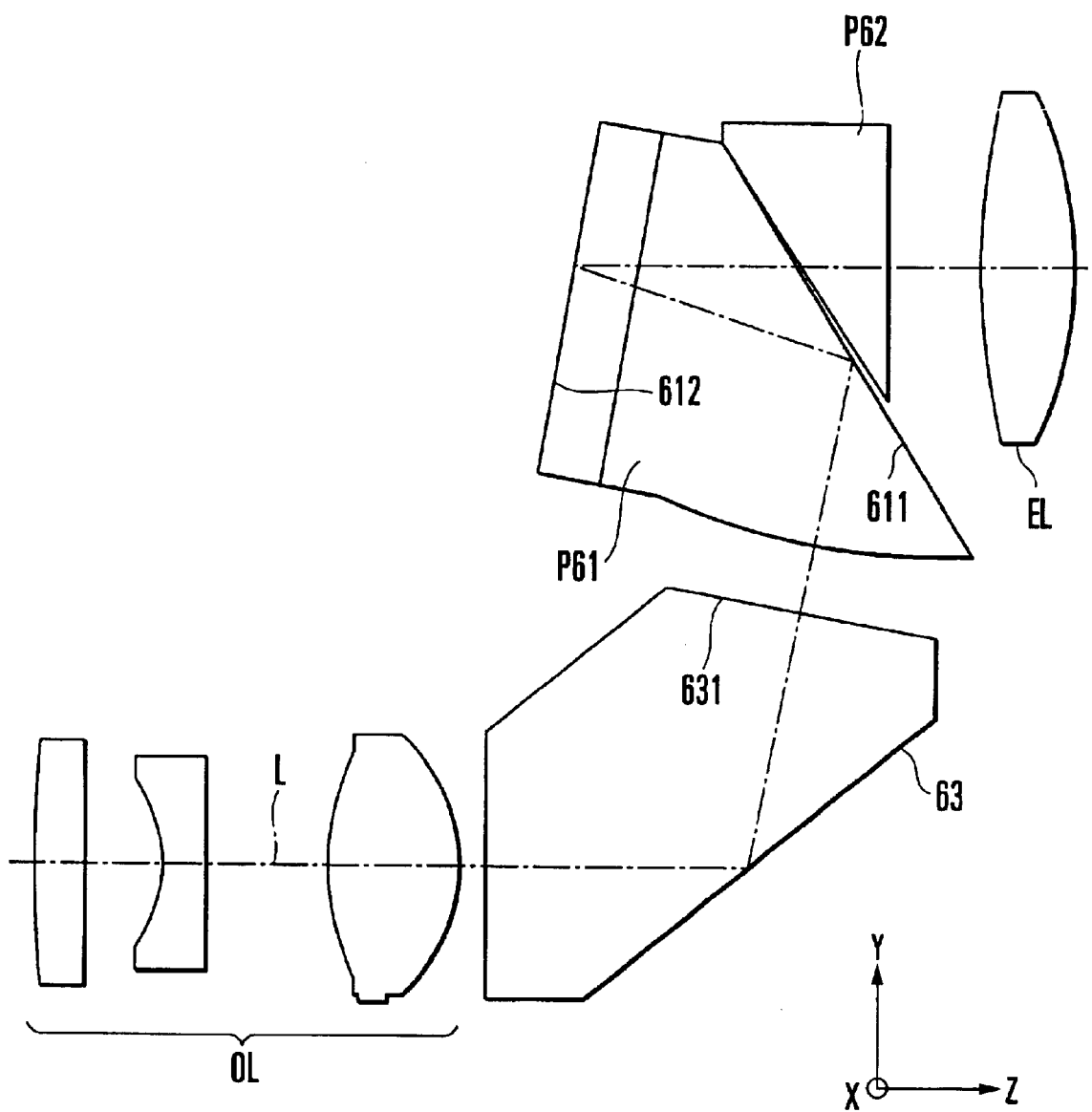
FIG. 26 is a sectional view showing essential parts of a viewfinder optical system of the real image type according to a twelfth embodiment of the invention.

In the case of the twelfth embodiment shown in FIG. 26, there are located, in order along the optical path, the objective lens OL, the pentagonal roof prism 63, the first prism P61, the second prism P62 and the eyepiece lens EL.

In the viewfinder optical system shown in FIG. 26, a light flux coming from the objective lens OL is made to enter the pentagonal roof prism 63. At the pentagonal roof prism 63, an optical path of the light flux is bent, and an inverted real viewfinder image is formed in the vicinity of an exit surface 631 of the pentagonal roof prism 63. Then, a light flux having entered the first prism P61 from the primary image forming plane is totally reflected by a transmission surface 611 toward a roof reflecting surface 612. At the roof reflecting surface 612, a light flux is reflected and image-inverted. The light flux coming from the roof reflecting surface 612 exits from the transmission surface 611 of the first prism P61 to a wedge-shaped minute air gap. Then, the light flux passes through the second prism P62 to be led to the eyepiece lens EL.

As described above, in the ninth and twelfth embodiments shown in FIGS. 22 and 26, the second prism P2 or the first prism P61, of the two prisms disposed with a wedge-shaped minute air gap put therebetween, is arranged to have an image inverting function.

Figure 27:
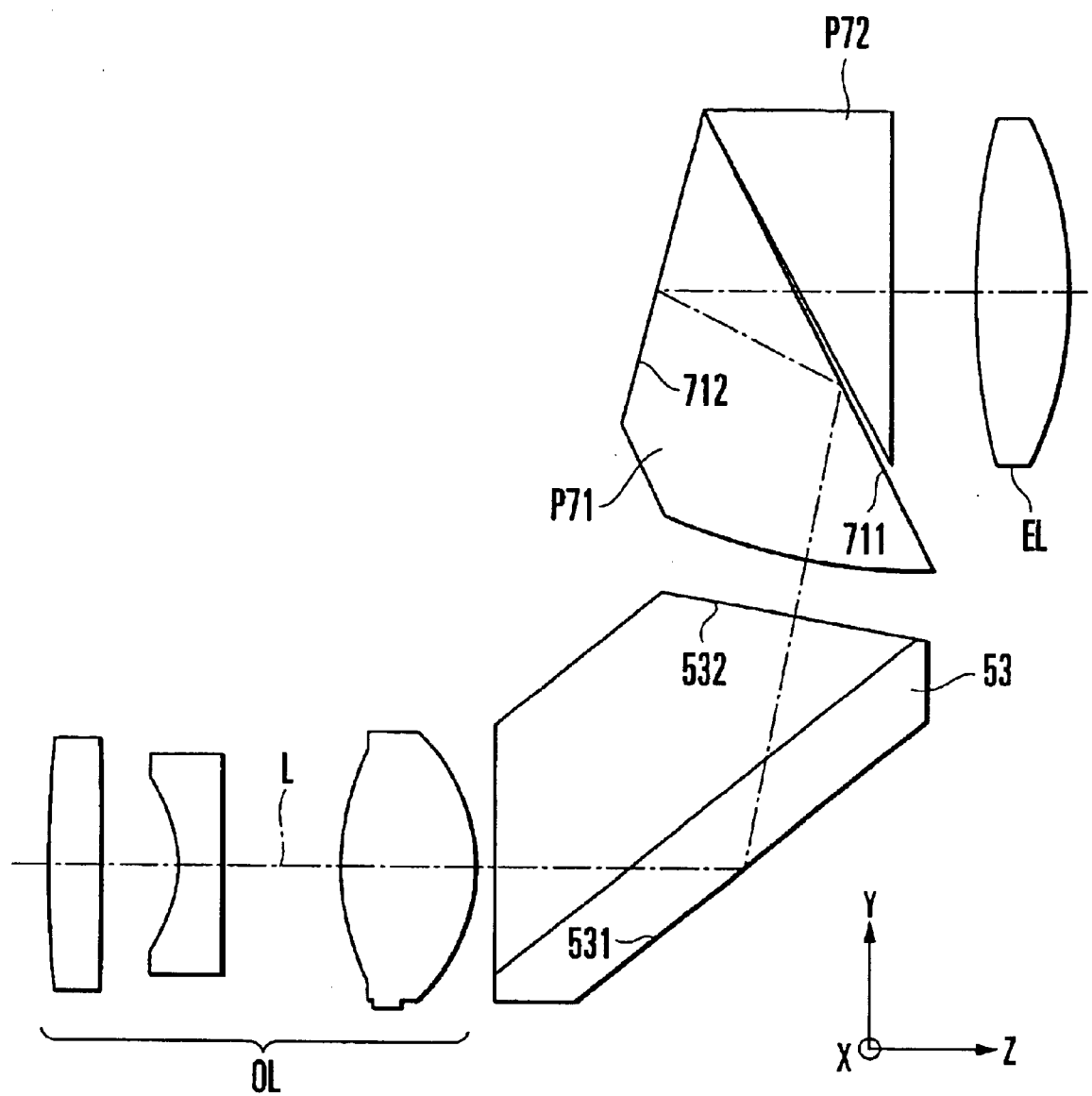
FIG. 27 is a sectional view showing essential parts of a viewfinder optical system according to a thirteenth embodiment of the invention, in which an image inverting unit is disposed separately form a prism in the twelfth embodiment shown in FIG. 26.

Further, in the case of the thirteenth embodiment shown in FIG. 27, there are located, in order along the optical path, the objective lens OL, the pentagonal roof prism 53, the first prism P71, the second prism P72 and the eyepiece lens EL.

In the viewfinder optical system shown in FIG. 27, a light flux coming from the objective lens OL is image-inverted by a roof reflecting surface 531 of the pentagonal roof prism 53 and is then imaged to form a non-inverted erecting viewfinder image in the vicinity of an exit surface 532 of the pentagonal roof prism 53. A light flux having entered the first prism P71 from them primary image forming plane is totally reflected by a transmission surface 711 to be once returned toward the object side. Then, the light flux is mirror-reflected by a reflecting surface 712 having vapor deposition or the like applied thereto, to be bent toward the pupil side. The light flux then passes through the wedge-shaped minute air gap and the second prism P72 to be led to the eyepiece lens EL.

As in the thirteenth and eleventh embodiments shown in FIG. 27 and FIG. 25, an image inverting unit, such as the pentagonal roof prism 53, may be provided separately from the two prisms disposed with a wedge-shaped minute air gap put therebetween.

In the ninth to thirteenth embodiments of the invention, described above, it is not necessary that one end portion of an exit surface of the first prism and one end portion of an entrance surface of the second prism are in contact with each other. Thus, as long as one end portion of an air gap between the first prism and the second prism is narrower than the other end portion thereof, i.e., the air gap is, for example, in a wedge shape, the advantageous effect of the invention can be attained.

However, in practice, in order to form a wedge-shaped minute air gap, it is preferred that one end portion of the exit surface of the first prism and one end portion of the entrance surface of the second prism are in contact with each other. In this case, the interval between the exit surface of the first prism and the entrance surface of the second prism becomes "0" outside a ray-effective aperture, i.e., the exit surface of the first prism and the entrance surface of the second prism are in contact with each other outside the ray-effective aperture.

Further, a protrusion may be provided on the exit surface of the first prism or the entrance surface of the second prism outside the ray-effective aperture so as to set the interval therebetween, so that the positional accuracy can be enhanced. In addition, if the first prism and the second prism are made of a glass member, the positioning of the first prism and the second prism may be effected by sandwiching a spacer member or the like therebetween. In this case, the spacer member is so formed as to light-block the outside of the ray-effective aperture, so that flare or the like can be effectively removed.

In each of the ninth to thirteenth-embodiments described above, for example, as shown in FIG. 23, when the interval between a surface vertex of the exit surface 12 of the first prism P1 and a surface vertex of the entrance surface 21 of the second prism P2, which form a minute air gap, is denoted by Dg, the interval Dg satisfies the following condition:

$$0 < Dg \leq 0.1 \quad \text{(unit: mm)}.$$

If the interval Dg is larger than "0.1", it is difficult to suppress the occurrence of a double image (ghost) due to the reflection of a ray inside the minute air gap, and to suppress the variation of aberration on the viewfinder pupil plane due to the difference in optical path length from the exit surface of the first prism to the pupil plane between right and left portions of a viewfinder field.

Further, in order to suppress ghost and the variation of aberration and to obtain a good viewfinder field, it is preferable that the interval Dg is not greater than "0.04". In addition, in a case where the first prism and the second prism are made of a glass member, there arises a problem in dew condensation if the minute air gap becomes too narrow. As a result, it is preferable that the interval Dg satisfies the following condition:

$$0.02 < Dg \leq 0.04 \quad \text{(unit: mm)}.$$

In each of the ninth to thirteenth embodiments described above, for example, as shown in FIG. 23, when an angle which the exit surface of the first prism and the entrance surface of the second prism, forming the minute air gap, make with each other is denoted by θg, the angle θg satisfies the following condition:

$$0' < \theta g < 50' \quad \text{(unit: minute } 1' = (1/60)°).$$

If the angle θg is larger than 50', the air gap on the side of a portion wider in the wedge shape becomes too large, so that it becomes difficult to correct decentering aberration. It is preferable that the angle θg satisfies the above-described condition while the interval Dg between vertexes of the exit surface of the first prism and the entrance surface of the second prism satisfies the above-described condition.

Next, an optical apparatus having each of the viewfinder optical systems described above, according to an embodiment of the invention, is described with reference to FIGS. 29(A) and 29(B).

Figure 29A:
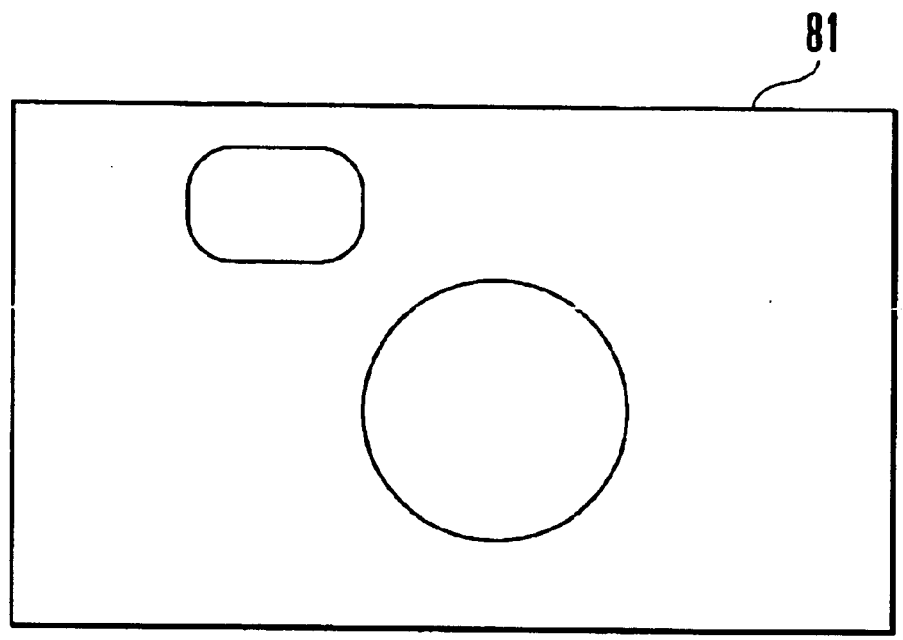
FIGS. 29(A) and 29(B) are a front view and a sectional view, respectively, of an optical apparatus having a viewfinder optical system according to each of the embodiments of the invention.
Figure 29B:
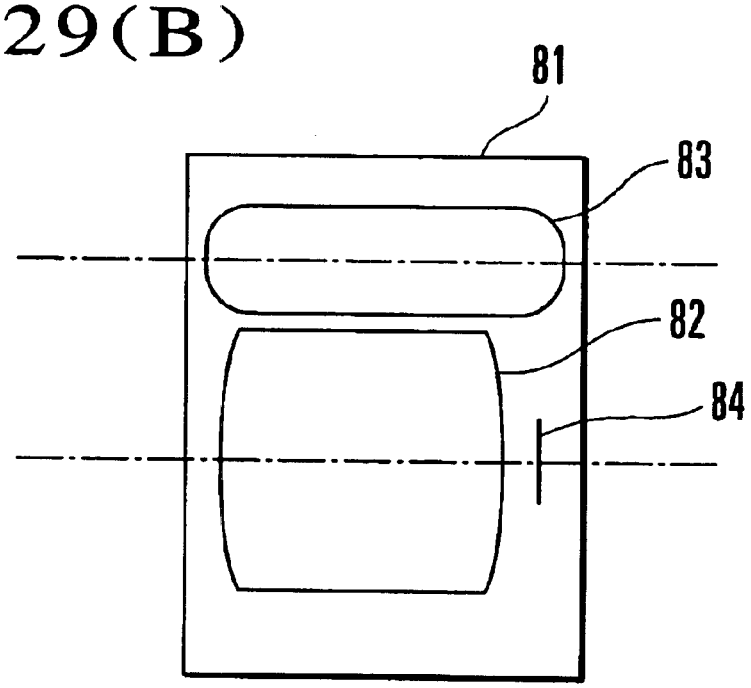
Figure 30:
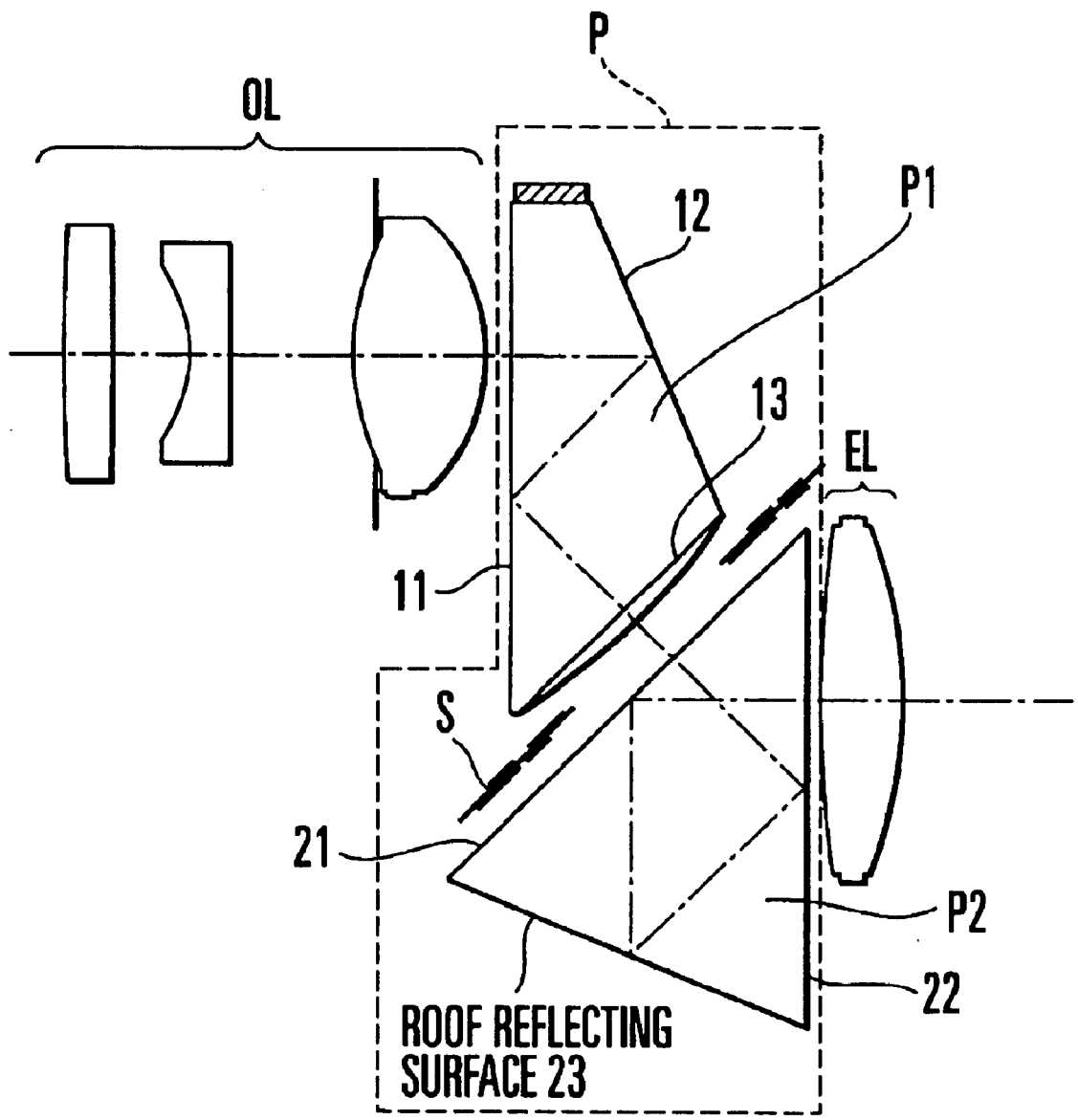
FIG. 30 is a sectional view showing essential parts of a conventional viewfinder optical system of the real image type.
Figure 31:
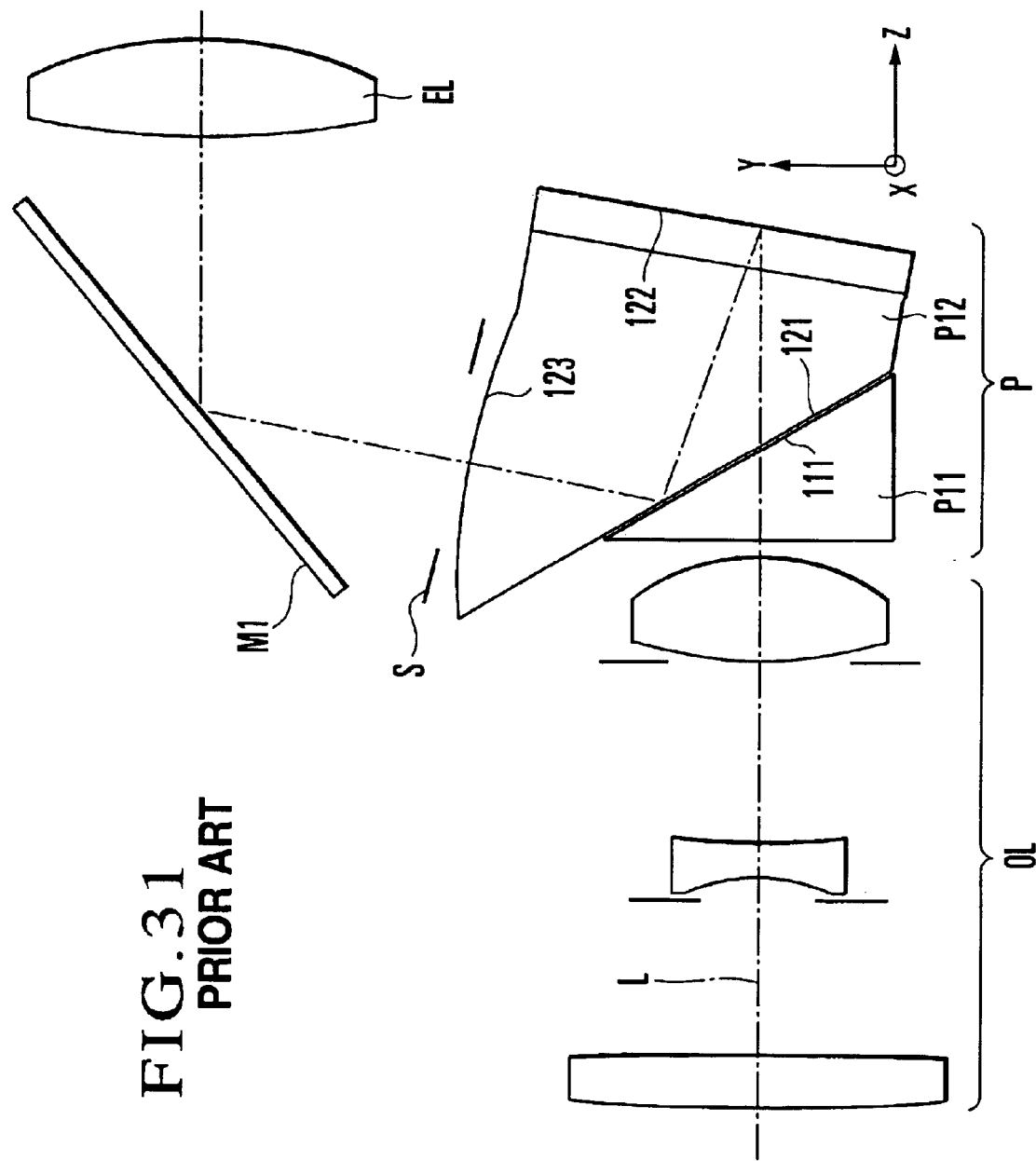
FIG. 31 is a sectional view showing essential parts of another conventional viewfinder optical system of the real image type.

FIG. 29(A) is a front view schematically showing the optical apparatus, and FIG. 29(B) is a side sectional view schematically showing the optical apparatus. In FIGS. 29(A) and 29(B), reference character 81 denotes a body (casing) of the optical apparatus, reference character 82 denotes a photographing optical system, reference character 83 denotes a viewfinder optical system according to each of the above-described embodiments, and reference character 84 denotes a film serving as a photosensitive plane.

By applying the viewfinder optical system according to each of the above-described embodiments to the optical apparatus, it is possible to realize a compact, high-performance optical apparatus According to the invention, as has been described above, it is possible to attain a viewfinder optical system in which, when an object image formed via an objective lens system is converted into a non-inverted erecting image to be observed through an eyepiece lens, by utilizing an image inverting unit having a first transparent body and a second transparent body which are disposed with an interval put therebetween, the second transparent body having only a function of transmitting a ray of light, the shape of at least one surface of the first transparent body and the second transparent body is a rotationally-asymmetrical surface, so as to enable a good viewfinder image to be observed over the whole range of a field of view, while suppressing decentering aberration.

Further, according to the invention, it is possible to attain a viewfinder optical system which is small in size and is capable of making a good viewfinder image to be observed over the whole range of a field of view, while having a high viewfinder image magnification and a wide angle of view.

Further, according to the embodiments described above, an exit surface of the first prism and an entrance surface of the second prism are disposed with a wedge-shaped minute air gap put therebetween, one end portion of the wedge-shaped minute air gap being narrower than the other end portion thereof, so that it is possible to prevent, as much as possible, decentering aberration, such as astigmatism or coma, and ghost from occurring due to the minute air gap, and it is possible to allow a good viewfinder image to be observed.

In addition, one of the first prism and the second prism functions as an image inverting unit, or an image inverting unit is disposed, separately from the first prism and the second prism, so that it is possible to shorten an optical path from the primary image forming plane to the eyepiece lens, and it is possible to allow a good viewfinder image to be observed while the viewfinder optical system has a high magnification range and a wide angle of view despite the reduction of the size thereof.

What is claimed is:

1. A viewfinder optical system for facilitating a reduction in the size thereof without increasing at least one of the incidence of ghost images and decentering aberration, comprising:

an objective lens unit;

an image inverting unit for converting an inverted object image formed via said objective lens unit into a non-inverted erecting image; and an eyepiece lens unit for observing the non-inverted erecting image, wherein said image inverting unit comprises a first transparent body and a second transparent body which are disposed with an interval put therebetween, said second transparent body having only a function of transmitting a ray of light, wherein said image inverting unit restrains creation of at least one of ghost images and decentering aberration by making the interval between said first transparent body and said second transparent body not uniform, and wherein a surface of said first transparent body which most closely faces said second transparent body is a total-reflection surface.

2. A viewfinder optical system according to claim 1, wherein at least one of a surface of said first transparent body and a surface of said second transparent body which are opposite to each other is a rotationally-asymmetrical surface.

3. A viewfinder optical system according to claim 2, wherein said first transparent body has a surface having only a function of reflecting a ray of light, and a surface having both a function of reflecting a ray of light and a function of transmitting a ray of light.

4. A viewfinder optical system according to claim 3, wherein said second transparent body has a second entrance surface for transmitting a light flux coming from said objective lens unit, and a transmission surface disposed at an acute angle with the second entrance surface, wherein said first transparent body consists of a first entrance surface disposed with the interval put between the transmission surface and the first entrance surface and arranged to allow a light flux coming from the transmission surface to enter the first entrance surface, a reflecting surface arranged to reflect a light flux coming from the first entrance surface toward the first entrance surface, a total-reflection surface provided at a part of the first entrance surface and arranged to totally reflect a light flux coming from the reflecting surface, and an exit surface arranged to allow a light flux coming from the total-reflection surface to exit, and wherein said image inverting unit further comprises a reflecting member arranged to reflect a light flux coming from the exit surface toward said eyepiece lens unit.

5. A viewfinder optical system according to claim 4, wherein the transmission surface is a rotationally-asymmetrical surface.

6. A viewfinder optical system according to claim 3, wherein said image inverting unit further comprises a reflecting member arranged to reflect, at least once, a light flux coming from said objective lens unit, wherein said second transparent body has a second entrance surface for transmitting a light flux coming from said reflecting member and a transmission surface disposed at an acute angle with the second entrance surface, and wherein said first transparent body consists of a first entrance surface disposed with the interval put between the transmission surface and the first entrance surface and arranged to allow a light flux coming from the transmission surface to enter the first entrance surface, a reflecting surface arranged to reflect a light flux coming from the first entrance surface toward the first entrance surface, a total-reflection surface provided at a part of the first entrance surface and arranged to totally reflect a light flux coming from the reflecting surface, and an exit surface arranged to allow a light flux coming from the total-reflection surface to exit.

7. A viewfinder optical system according to claim 6, wherein the transmission surface is a rotationally-asymmetrical surface.

8. A viewfinder optical system according to claim 3, wherein said first transparent body consists of a first entrance surface for transmitting a light flux coming from said objective lens unit, a total-reflection surface arranged to totally reflect a light flux coming from the first entrance surface, a reflecting surface arranged to reflect a light flux coming from the total-reflection surface toward the total-reflection surface, and an exit surface provided at a part of the total-reflection surface and arranged to allow a light flux coming from the reflecting surface to exit, wherein said second transparent body has a second entrance surface disposed with the interval put between the exit surface and the second entrance surface and arranged to allow a light flux coming from the exit surface to enter the second entrance surface, and a transmission surface disposed at an acute angle with the second entrance surface and arranged to allow a light flux coming from the second entrance surface to exit, and wherein said image inverting unit further comprises a reflecting member arranged to reflect, at least once, a light flux coming from the transmission surface to lead the reflected light flux to said eyepiece-lens unit.

9. A viewfinder optical system according to claim 8, wherein the second entrance surface is a rotationally-asymmetrical surface.

10. A viewfinder optical system according to claim 3, wherein said image inverting unit further comprises a reflecting member arranged to reflect, at least once, a light flux coming from said objective lens unit, wherein said first transparent body consists of a first entrance surface for transmitting a light flux coming from said reflecting member, a total-reflection surface arranged to totally reflect a light flux coming from the first entrance surface, a reflecting surface arranged to reflect a light flux coming from the total-reflection surface toward the total-reflection surface, and an exit surface provided at a part of the total-reflection surface and arranged to allow a light flux coming from the reflecting surface to exit, and wherein said second transparent body has a second entrance surface disposed with the interval put between the exit surface and the second entrance surface and arranged to allow a light flux coming from the exit surface to enter the second entrance surface, and a transmission surface disposed at an acute angle with the second entrance surface and arranged to allow a light flux coming from the second entrance surface to exit to said eyepiece lens unit.

11. A viewfinder optical system according to claim 10, wherein the second entrance surface is a rotationally-asymmetrical surface.

12. A viewfinder optical system according to claim 3, wherein the rotationally-asymmetrical surface is a surface symmetrical with respect to a given direction.

13. A viewfinder optical system according to claim 12, wherein, when Cartesian coordinates using X, Y and Z axes are adopted, the rotationally-asymmetrical surface is a cylindrical surface having a predetermined curvature in a plane perpendicular to the X axis and having no curvature with respect to a direction of the X axis.

14. A viewfinder optical system according to claim 12, wherein, when Cartesian coordinates using X, Y and Z axes are adopted, the rotationally-asymmetrical surface is a toric surface in which a curvature in a plane perpendicular to the X axis differs from a curvature in a plane perpendicular to the Y axis.

15. A viewfinder optical system according to claim 3, wherein, when Cartesian coordinates using X, Y and Z axes are adopted, the rotationally-asymmetrical surface is a surface having two curvatures in a plane perpendicular to the X axis and having no curvature with respect to a direction of the X axis.

16. A viewfinder optical system according to claim 3, wherein the rotationally-asymmetrical surface has no axis of rotational symmetry.

17. A viewfinder optical system according to claim 3, wherein said first transparent body has a roof surface.

18. A viewfinder optical system according to claim 1, wherein the interval between a surface of said first transparent body and a surface of said second transparent body which are opposite to each other varies monotonically.

19. A viewfinder optical system according to claim 18, wherein each of the surface of said first transparent body and the surface of said second transparent body which are opposite to each other is a plane surface.

20. A viewfinder optical system according to claim 19, wherein said first transparent body has a surface having only a function of reflecting a ray of light, and a surface having both a function of reflecting a ray of light and a function of transmitting a ray of light.

21. A viewfinder optical system according to claim 20, wherein said second transparent body has a second entrance surface for transmitting a light flux coming from said objective lens unit, and a transmission surface disposed at an acute angle with the second entrance surface, wherein said first transparent body consists of a first entrance surface disposed with the interval put between the transmission surface and the first entrance surface and arranged to allow a light flux coming from the transmission surface to enter the first entrance surface, a reflecting surface arranged to reflect a light flux coming from the first entrance surface toward the first entrance surface, a total-reflection surface provided at a part of the first entrance surface and arranged to totally reflect a light flux coming from the reflecting surface, and an exit surface arranged to allow a light flux coming from the total-reflection surface to exit, and wherein said image inverting unit further comprises a reflecting member arranged to reflect a light flux coming from the exit surface toward said eyepiece lens unit.

22. A viewfinder optical system according to claim 20, wherein said image inverting unit further comprises a reflecting member arranged to reflect, at least once, a light flux coming from said objective lens unit, wherein said second transparent body has a second entrance surface for transmitting a light flux coming from said reflecting member and a transmission surface disposed at an acute angle with the second entrance surface, and wherein said first transparent body consists of a first entrance surface disposed with the interval put between the transmission surface and the first entrance surface and arranged to allow a light flux coming from the transmission surface to enter the first entrance surface, a reflecting surface arranged to reflect a light flux coming from the first entrance surface toward the first entrance surface, a total-reflection surface provided at a part of the first entrance surface and arranged to totally reflect a light flux coming from the reflecting surface, and an exit surface arranged to allow a light flux coming from the total-reflection surface to exit.

23. A viewfinder optical system according to claim 20, wherein said first transparent body consists of a first entrance surface for transmitting a light flux coming from said objective lens unit, a total-reflection surface arranged to totally reflect a light flux coming from the first entrance surface, a reflecting surface arranged to reflect a light flux coming from the total-reflection surface toward the total-reflection surface, and an exit surface provided at a part of the total-reflection surface and arranged to allow a light flux coming from the reflecting surface to exit, wherein said second transparent body has a second entrance surface disposed with the interval put between the exit surface and the second entrance surface and arranged to allow a light flux coming from the exit surface to enter the second entrance surface, and a transmission surface disposed at an acute angle with the second entrance surface and arranged to allow a light flux coming from the second entrance surface to exit, and wherein said image inverting unit further comprises a reflecting member arranged to reflect, at least once, a light flux coming from the transmission surface to lead the reflected light flux to said eyepiece lens unit.

24. A viewfinder optical system according to claim 20, wherein said image inverting unit further comprises a reflecting member arranged to reflect, at least once, a light flux coming from said objective lens unit, wherein said first transparent body consists of a first entrance surface for transmitting a light flux coming from said reflecting member, a total-reflection surface arranged to totally reflect a light flux coming from the first entrance surface, a reflecting surface arranged to reflect a light flux coming from the total-reflection surface toward the total-reflection surface, and an exit surface provided at a part of the total-reflection surface and arranged to allow a light flux coming from the reflecting surface to exit, and wherein said second transparent body has a second entrance surface disposed with the interval put between the exit surface and the second entrance surface and arranged to allow a light flux coming from the exit surface to enter the second entrance surface, and a transmission surface disposed at an acute angle with the second entrance surface and arranged to allow a light flux coming from the second entrance surface to exit to said eyepiece lens unit.

25. A viewfinder optical system according to claim 20, wherein said first transparent body has a roof surface.

26. A viewfinder optical system according to claim 20, wherein said image inverting unit further comprises a reflecting member arranged to reflect a ray of light, wherein said reflecting member is separate from said first transparent body and said second transparent body, and wherein said reflecting member has a roof surface.

27. A viewfinder optical system according to claim 20, wherein said image inverting unit further comprises a reflecting member arranged to reflect a ray of light, wherein said reflecting member is separate from said first transparent body and said second transparent body, and wherein said reflecting member is made from a transparent body.

28. A viewfinder optical system according to claim 19, wherein the surface of said first transparent body and the surface of said second transparent body which are opposite to each other are in contact with each other at a portion outside a ray-effective aperture.

29. A viewfinder optical system according to claim 19, wherein the interval between the surface of said first transparent body and the surface of said second transparent body which are opposite to each other is set narrower toward a portion on a side of the larger one of angles which a ray of light incident on the interval makes with the interval.

30. A viewfinder optical system according to claim 19, wherein, when the interval between vertexes of the surface of said first transparent body and the surface of said second transparent body is denoted by Dg, the following condition is satisfied:

$$0 < Dg \leq 0.1 \text{ mm}.$$

31. A viewfinder optical system according to claim 19, wherein, when an angle which the surface of said first transparent body and the surface of said second transparent body, constituting the interval, make with each other is denoted by θg, the following condition is satisfied with 1' being (1/60)°:

$$0' < \theta g \leq 50'.$$

32. A viewfinder optical system according to claim 3, wherein said image inverting unit further comprises a reflecting member arranged to reflect a ray of light,
wherein said reflecting member is separate from said first transparent body and said second transparent body, and
wherein said reflecting member has a roof surface.

33. A viewfinder optical system according to claim 3, wherein said image inverting unit further comprises a reflecting member arranged to reflect a ray of light,
wherein said reflecting member is separate from said first transparent body and said second transparent body, and
wherein said reflecting member comprises an entrance surface, a reflecting surface, and an exit surface.

34. An optical apparatus, comprising:
a viewfinder optical system according to claim 1; and
a casing holding said viewfinder optical system.

35. An optical apparatus according to claim 34, wherein at least one of a surface of said first transparent body and a surface of said second transparent body which are opposite to each other is a rotationally-asymmetrical surface.

36. An optical apparatus according to claim 35, wherein said first transparent body has a surface having only a function of reflecting a ray of light and a surface having both a function of reflecting a ray of light and a function of transmitting a ray of light.

37. An optical apparatus according to claim 34, wherein the interval between a surface of said first transparent body and a surface of said second transparent body which are opposite to each other varies monotonically.

38. An optical apparatus according to claim 37, wherein each of the surface of said first transparent body and the surface of said second transparent body which are opposite to each other is a plane surface.

39. An optical apparatus according to claim 38, wherein said first transparent body has a surface having only a function of reflecting a ray of light, and a surface having both a function of reflecting a ray of light and a function of transmitting a ray of light.

40. A viewfinder optical system for facilitating a reduction in the size thereof without increasing at least one of the incidence of ghost images and decentering aberration, comprising:

an objective lens unit;
an image inverting unit for converting an inverted object image formed via said objective lens unit into a non-inverted erecting image; and
an eyepiece lens unit for observing the non-inverted erecting image,
wherein said image inverting unit comprises a first transparent body and a second transparent body which are disposed with an interval put therebetween, said second transparent body having only a function of transmitting a ray of light, and
wherein said image inverting unit restrains creation of at least one of ghost images and decentering aberration by making at least one surface of said first transparent body and said second transparent body a rotationally-asymmetrical surface.

41. A viewfinder optical system according to claim 40, wherein said first transparent body has a surface having only a function of reflecting a ray of light, and a surface having both a function of reflecting a ray of light and a function of transmitting a ray of light.

42. A viewfinder optical system according to claim 41, wherein said second transparent body has a second entrance surface for transmitting a light flux coming from said objective lens unit, and a transmission surface disposed at an acute angle with the second entrance surface,
wherein said first transparent body consists of a first entrance surface disposed with the interval put between the transmission surface and the first entrance surface and arranged to allow a light flux coming from the transmission surface to enter the first entrance surface, a reflecting surface arranged to reflect a light flux coming from the first entrance surface toward the first entrance surface, a total-reflection surface provided at a part of the first entrance surface and arranged to totally reflect a light flux coming from the reflecting surface, and an exit surface arranged to allow a light flux coming from the total-reflection surface to exit, and
wherein said image inverting unit further comprises a reflecting member arranged to reflect a light flux coming from the exit surface toward said eyepiece lens unit.

43. A viewfinder optical system according to claim 42, wherein the transmission surface is a rotationally-asymmetrical surface.

44. A viewfinder optical system according to claim 41, wherein said image inverting unit further comprises a reflecting member arranged to reflect, at least once, a light flux coming from said objective lens unit,
wherein said second transparent body has a second entrance surface for transmitting a light flux coming from said reflecting member and a transmission surface disposed at an acute angle with the second entrance surface, and
wherein said first transparent body consists of a first entrance surface disposed with the interval put between the transmission surface and the first entrance surface and arranged to allow a light flux coming from the transmission surface to enter the first entrance surface, a reflecting surface arranged to reflect a light flux coming from the first entrance surface toward the first entrance surface, a total-reflection surface provided at a part of the first entrance surface and arranged to totally reflect a light flux coming from the reflecting surface, and an exit surface arranged to allow a light flux coming from the total-reflection surface to exit.

45. A viewfinder optical system according to claim 44, wherein the transmission surface is a rotationally-asymmetrical surface.

46. A viewfinder optical system according to claim 41, wherein said first transparent body consists of a first entrance surface for transmitting a light flux coming from said objective lens unit, a total-reflection surface arranged to totally reflect a light flux coming from the first entrance surface, a reflecting surface arranged to reflect a light flux coming from the total-reflection surface toward the total-reflection surface, and an exit surface provided at a part of the total-reflection surface and arranged to allow a light flux coming from the reflecting surface to exit, wherein said second transparent body has a second entrance surface disposed with the interval put between the exit surface and the second entrance surface and arranged to allow a light flux coming from the exit surface to enter the second entrance surface, and a transmission surface disposed at an acute angle with the second entrance surface and arranged to allow a light flux coming from the second entrance surface to exit, and wherein said image inverting unit further comprises a reflecting member arranged to reflect, at least once, a light flux coming from the transmission surface to lead the reflected light flux to said eyepiece lens unit.

47. A viewfinder optical system according to claim 46, wherein the second entrance surface is a rotationally-asymmetrical surface.

48. A viewfinder optical system according to claim 41, wherein said image inverting unit further comprises a reflecting member arranged to reflect, at least once, a light flux coming from the objective lens unit, wherein said first transparent body consists of a first entrance surface for transmitting a light flux coming from said reflecting member, a total-reflection surface arranged to totally reflect a light flux coming from the first entrance surface, a reflecting surface arranged to reflect a light flux coming from the total-reflection surface toward the total-reflection surface, and an exit surface provided at a part of the total-reflection surface and arranged to allow a light flux coming from the reflecting surface to exit, and wherein said second transparent body has a second entrance surface disposed with the interval put between the exit surface and the second entrance surface and arranged to allow a light flux coming from the exit surface to enter the second entrance surface, and a transmission surface disposed at an acute angle with the second entrance surface and arranged to allow a light flux coming from the second entrance surface to exit to said eyepiece lens unit.

49. A viewfinder optical system according to claim 48, wherein the second entrance surface is a rotationally-asymmetrical surface.

50. A viewfinder optical system according to claim 41, wherein the rotationally-asymmetrical surface is a surface symmetrical with respect to a given direction.

51. A viewfinder optical system according to claim 50, wherein, when Cartesian coordinates using X, Y and Z axes are adopted, the rotationally-asymmetrical surface is a cylindrical surface having a predetermined curvature in a plane perpendicular to the X axis and having no curvature with respect to a direction of the X axis.

52. A viewfinder optical system according to claim 50, wherein, when Cartesian coordinates using X, Y and Z axes are adopted, the rotationally-asymmetrical surface is a toric surface in which a curvature in a plane perpendicular to the X axis differs from a curvature in a plane perpendicular to the Y axis.

53. A viewfinder optical system according to claim 41, wherein, when Cartesian coordinates using X, Y and Z axes are adopted, the rotationally-asymmetrical surface is a surface having two curvatures in a plane perpendicular to the X axis and having no curvature with respect to a direction of the X axis.

54. A viewfinder optical system according to claim 41, wherein the rotationally-asymmetrical surface has no axis of rotational symmetry.

55. A viewfinder optical system according to claim 41, wherein said first transparent body has a roof surface.

56. A viewfinder optical system according to claim 41, wherein said image inverting unit further comprises a reflecting member arranged to reflect a ray of light, wherein said reflecting member is separate from said first transparent body and said second transparent body, and wherein said reflecting member has a roof surface.

57. A viewfinder optical system according to claim 41, wherein said image inverting unit further comprises a reflecting member arranged to reflect a ray of light, wherein said reflecting member is separate from said first transparent body and said second transparent body, and wherein said reflecting member comprises an entrance surface, a reflecting surface, and an exit surface.

58. An optical apparatus, comprising:

a viewfinder optical system according to claim 40, and a casing holding said viewfinder optical system.

59. An optical apparatus according to claim 58, wherein said first transparent body has a surface having only a function of reflecting a ray of light, and a surface having both a function of reflecting a ray of light and a function of transmitting a ray of light.

\* \* \* \* \*

UNITED STATES PATENT AND TRADEMARK OFFICE
CERTIFICATE OF CORRECTION

PATENT NO. : 6,778,324 B1
DATED : August 17, 2004
INVENTOR(S) : Yumiko Kato

It is certified that error appears in the above-identified patent and that said Letters Patent is hereby corrected as shown below:

Column 4,
Line 21, "the to" should read -- the --.
Line 53, "FIG. 6" should read -- FIG. 8 --.

Column 5,
Line 23, ":each" should read -- each --.

Column 6,
Line 10, "an,d" should read -- and --.
Line 14, "has" should read -- have --.

Column 7,
Lines 40-43, should be moved to line 52.
Line 46, "$B22x^4 + C22x^6 + D22x^8$" should read -- $B22y^4 + C22y^6 + D22y^8$ --.
Line 49, "$x^2/r21$" should read -- $y^2/r21$ --.
Line 58, "lens." should read -- lens --.

Column 8,
Line 44, "famine" should read -- forming --.
Line 52, "FIGS. $1_\varnothing$(A), $1_\varnothing$(B) and $1_\varnothing$(C)" should read -- FIGS. 11(A), 11(B) and 11(C) --.
Line 67, "11( )" should read -- 11(A) --.

Column 9,
Line 7, "ad" should be deleted.
Line 37, "en" should be deleted.
Line 57, "decentering," should read -- decentering --.

Column 11,
Line 53, "aid" should read -- and --.

Column 12,
Line 64, "(R11, R14)" should read -- (R13, R14) --.

Column 13,
Line 20, "the:" should read -- the --.

Column 14,
Line 16, "formed-by" should read -- formed by --.
Line 43, "eighth-embodiment" should read -- eighth embodiment --.

UNITED STATES PATENT AND TRADEMARK OFFICE
CERTIFICATE OF CORRECTION

PATENT NO. : 6,778,324 B1
DATED : August 17, 2004
INVENTOR(S) : Yumiko Kato

It is certified that error appears in the above-identified patent and that said Letters Patent is hereby corrected as shown below:

Column 15,
Line 19, "28.4º"" should read -- 28.4º --.
Line 66, "2 15" should read -- 2.15 --.

Column 16,
Line 40, "28.4" should read -- 28.4º --.

Column 18,
Line 23, "prism P2;" should read -- prism P2, --.

Column 20,
Line 14, "image-forming" should read -- image forming --.
Line 55, "them" should read -- the --.

Column 21,
Line 31, "thirteenth-embodiments" should read -- thirteenth embodiments --.

Column 24,
Line 28, "eyepiece-lens" should read -- eyepiece lens --.

Column 30,
Line 44, "claim 40," should read -- claim 40; --.

Signed and Sealed this

Nineteenth Day of April, 2005

JON W. DUDAS
*Director of the United States Patent and Trademark Office*